(12) United States Patent
Saito

(10) Patent No.: US 11,205,976 B2
(45) Date of Patent: Dec. 21, 2021

(54) CONTROL METHOD FOR PIEZOELECTRIC DRIVING DEVICE, PIEZOELECTRIC DRIVING DEVICE, AND ROBOT

(71) Applicant: Seiko Epson Corporation, Tokyo (JP)

(72) Inventor: Hidetoshi Saito, Fujimi (JP)

(73) Assignee: SEIKO EPSON CORPORATION, Tokyo (JP)

(*) Notice: Subject to any disclaimer, the term of this patent is extended or adjusted under 35 U.S.C. 154(b) by 111 days.

(21) Appl. No.: 16/857,402

(22) Filed: Apr. 24, 2020

(65) Prior Publication Data

US 2020/0343830 A1 Oct. 29, 2020

(30) Foreign Application Priority Data

Apr. 26, 2019 (JP) .............................. JP2019-086366

(51) Int. Cl.
*H02N 2/14* (2006.01)
*B41J 25/304* (2006.01)
*H02N 2/10* (2006.01)
*H02N 2/06* (2006.01)
*B41J 23/02* (2006.01)
*B41J 29/393* (2006.01)
(Continued)

(52) U.S. Cl.
CPC ................ *H02N 2/145* (2013.01); *B25J 9/00* (2013.01); *B41J 13/0009* (2013.01); *B41J 19/202* (2013.01); *B41J 23/02* (2013.01); *B41J 25/304* (2013.01); *B41J 29/393* (2013.01); *H02N 2/004* (2013.01); *H02N 2/0075* (2013.01); *H02N 2/06* (2013.01); *H02N 2/103* (2013.01)

(58) Field of Classification Search
CPC ...... H02N 2/145; H02N 2/103; H02N 2/0075; H02N 2/004; H02N 2/06; B41J 13/0009; B41J 19/202; B41J 23/02; B41J 25/304; B41J 29/393; B25J 9/00
See application file for complete search history.

(56) References Cited

U.S. PATENT DOCUMENTS 9,742,313 B2 * 8/2017 Urano .................... H02N 2/103
9,744,761 B2 * 8/2017 Nozawa ............... B41J 2/04541
(Continued)

FOREIGN PATENT DOCUMENTS

JP 2007-244181 A 9/2007
JP 2013-062938 A 4/2013

*Primary Examiner* — Emily P Pham
(74) *Attorney, Agent, or Firm* — Yu Gang

(57) ABSTRACT

There is provided a control method for a piezoelectric driving device including a vibrating body configured to vibrate when a driving signal including a periodic signal is applied to a piezoelectric element for driving, a section to be driven that is driven by the vibration of the vibrating body, and a driving-signal generating section configured to generate the driving signal using a pulse signal generated based on a target pulse duty ratio. The driving-signal generating section detects voltage amplitude generated in the piezoelectric element for driving and generates the target pulse duty ratio based on the voltage amplitude. The driving signal includes an intermittent signal formed by an output period in which the periodic signal is output and a suspension period in which the output of the periodic signal is suspended. The driving-signal generating section detects the output-period voltage amplitude and does not detect the suspension-period voltage amplitude.

10 Claims, 16 Drawing Sheets

(51) Int. Cl.
*H02N 2/00* (2006.01)
*B41J 13/00* (2006.01)
*B41J 19/20* (2006.01)
*B25J 9/00* (2006.01)

(56) References Cited

U.S. PATENT DOCUMENTS

2007/0040471 A1\* 2/2007 Ollila .................... H02N 2/026
              310/317
2007/0247023 A1 10/2007 Tanimura
2013/0063054 A1 3/2013 Ogawa et al.

\* cited by examiner

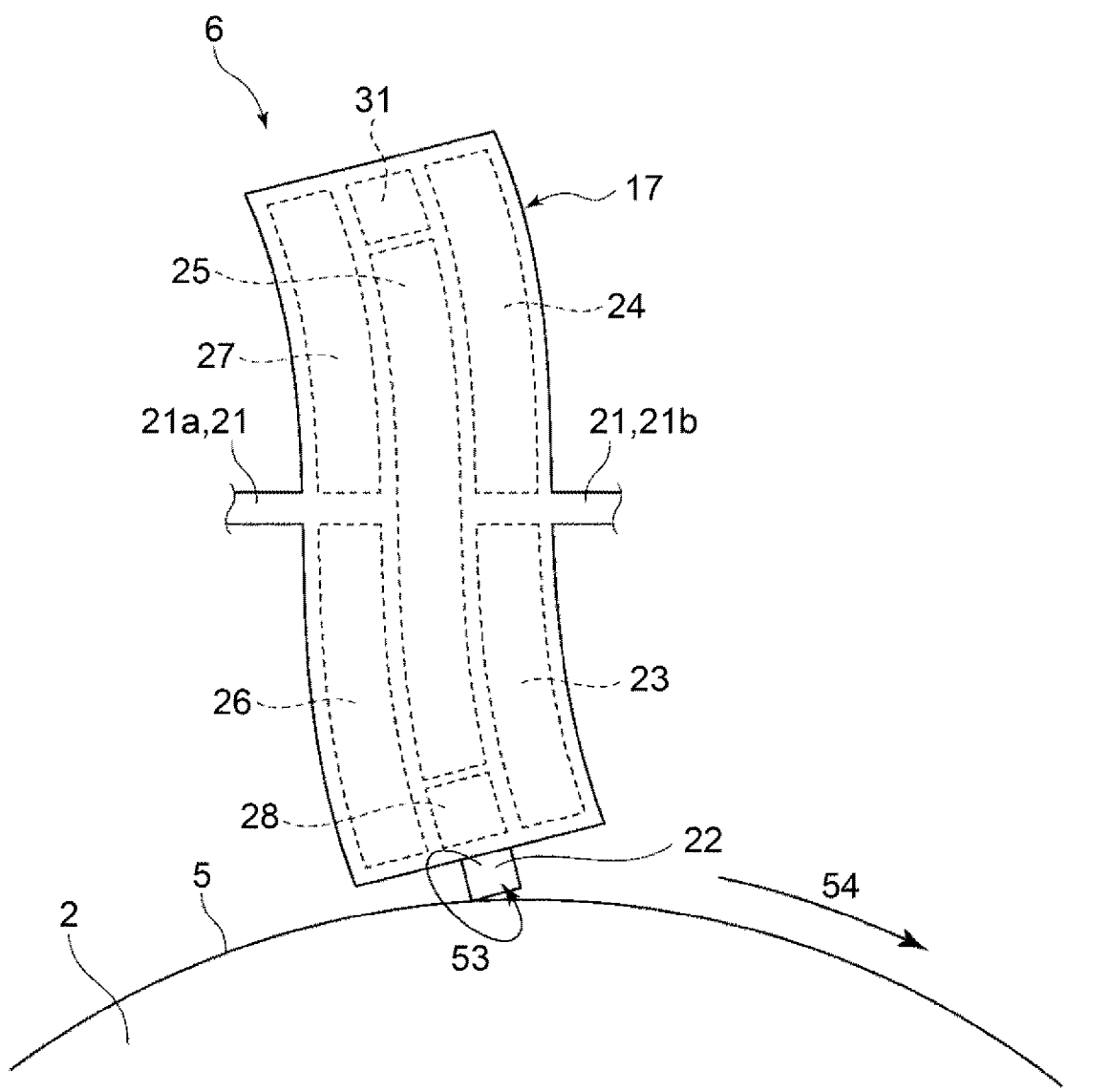
FIG. 8
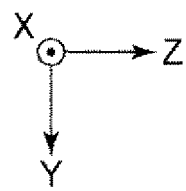

TARGET DRIVING VOLTAGE

TARGET PULSE DUTY RATIO [%]

CONTROL METHOD FOR PIEZOELECTRIC DRIVING DEVICE, PIEZOELECTRIC DRIVING DEVICE, AND ROBOT

The present application is based on, and claims priority from JP Application Serial Number 2019-086366, filed Apr. 26, 2019, the disclosure of which is hereby incorporated by reference herein in its entirety.

BACKGROUND

1. Technical Field

The present disclosure relates to a control method for a piezoelectric driving device, the piezoelectric driving device, and a robot.

2. Related Art

JP-A-2007-244181 (Patent Literature 1) discloses a driving device including: an ultrasonic motor including a piezoelectric element that extends and contracts according to application of a voltage and drives a movable section with an extending and contracting motion; and a driving-signal generating section that intermittently outputs a periodic signal. The driving-signal generating section includes: a basic-signal generating section that outputs an alternating signal having fixed amplitude as a basic signal; a pulse-signal generating section that outputs a pulse signal repeatedly turned on and off at a cycle longer than a cycle of the basic signal; and a switching section that directly outputs the basic signal only when the pulse signal is on. The driving signal output from such a driving-signal generating section is an intermittent signal. Therefore, it is possible to reduce driving speed of the ultrasonic motor compared with when a duty ratio of the pulse signal is 100%.

In the driving device including the piezoelectric element, feedback control for changing a generation condition for the driving signal has been examined to detect voltage amplitude of the alternating driving signal and reduce a difference between a result of the detection and target voltage amplitude. In such feedback control, it is necessary to continue to monitor a difference between the amplitude of an actually output driving signal and the target voltage amplitude. When the driving signal is the intermittent signal, voltage amplitude at an ON time when the basic signal is directly output and voltage amplitude at an OFF time when the basic signal is not output need to be respectively feedbacked. Specifically, the driving signal output from the switching section is distributed between the switching section and the piezoelectric element and returned to the pulse-signal generating section that determines the generation condition for the driving signal. However, the switching section operates to output the basic signal at the ON time and set a high-impedance state at the OFF time not to output the basic signal. Accordingly, at the OFF time, a circuit between the switching section and the piezoelectric element is in a floating state.

When the feedback control is performed in such a driving device, the ultrasonic motor continues driving even at the OFF time when the basic signal is not output. Therefore, electric charges involved in a piezoelectric effect are generated in the piezoelectric element. Voltage amplitude unrelated to the driving signal is returned to the pulse-signal generating section. As a result, unintended voltage amplitude is detected and the accuracy of the driving signal is deteriorated. Accordingly, target driving cannot be accurately performed.

SUMMARY

A control method for a piezoelectric driving device according to an application example of the present disclosure is a control method for a piezoelectric driving device including: a vibrating body including a piezoelectric element for driving and configured to vibrate when a driving signal including a periodic signal is applied to the piezoelectric element for driving; a section to be driven that is driven by the vibration of the vibrating body; and a driving-signal generating section configured to generate the driving signal using a pulse signal generated based on a target pulse duty ratio. The driving-signal generating section detects voltage amplitude generated in the piezoelectric element for driving and generates the target pulse duty ratio based on the voltage amplitude. The driving signal includes an intermittent signal formed by an output period in which the periodic signal is output and a suspension period in which the output of the periodic signal is suspended. When the voltage amplitude in the output period is represented as output-period voltage amplitude and the voltage amplitude in the suspension period is represented as suspension-period voltage amplitude, the driving-signal generating section detects the output-period voltage amplitude and does not detect the suspension-period voltage amplitude.

BRIEF DESCRIPTION OF THE DRAWINGS

FIG. 8 is a schematic plan view for explaining a driving state of the piezoelectric actuator.

DESCRIPTION OF EXEMPLARY EMBODIMENTS

Preferred embodiments of the present disclosure are explained in detail below with reference to the accompanying drawings.

1. First Embodiment

First, a piezoelectric driving device according to a first embodiment is explained.

Figure 1:
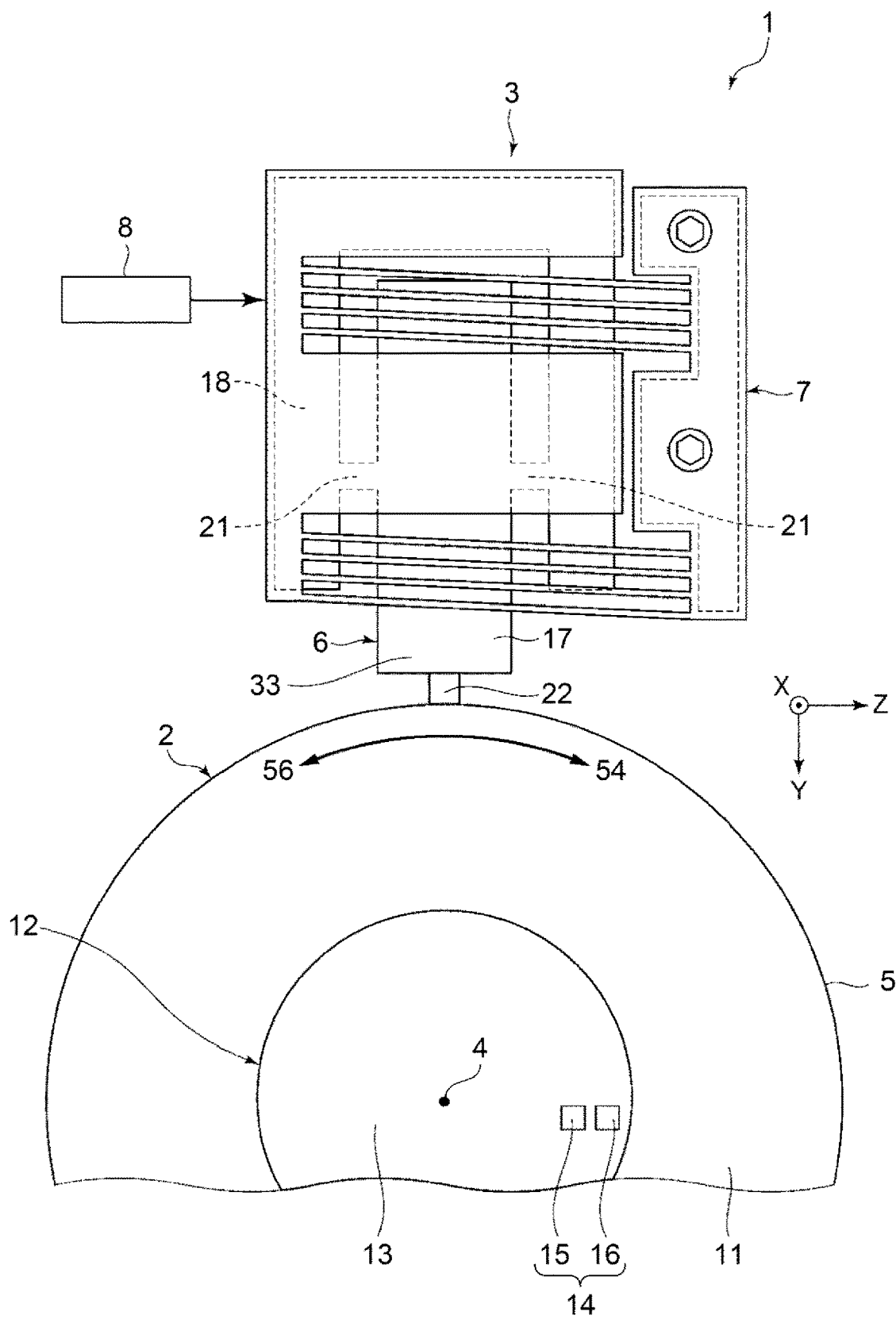
FIG. 1 is a plan view showing a piezoelectric driving device according to a first embodiment.
Figure 2:
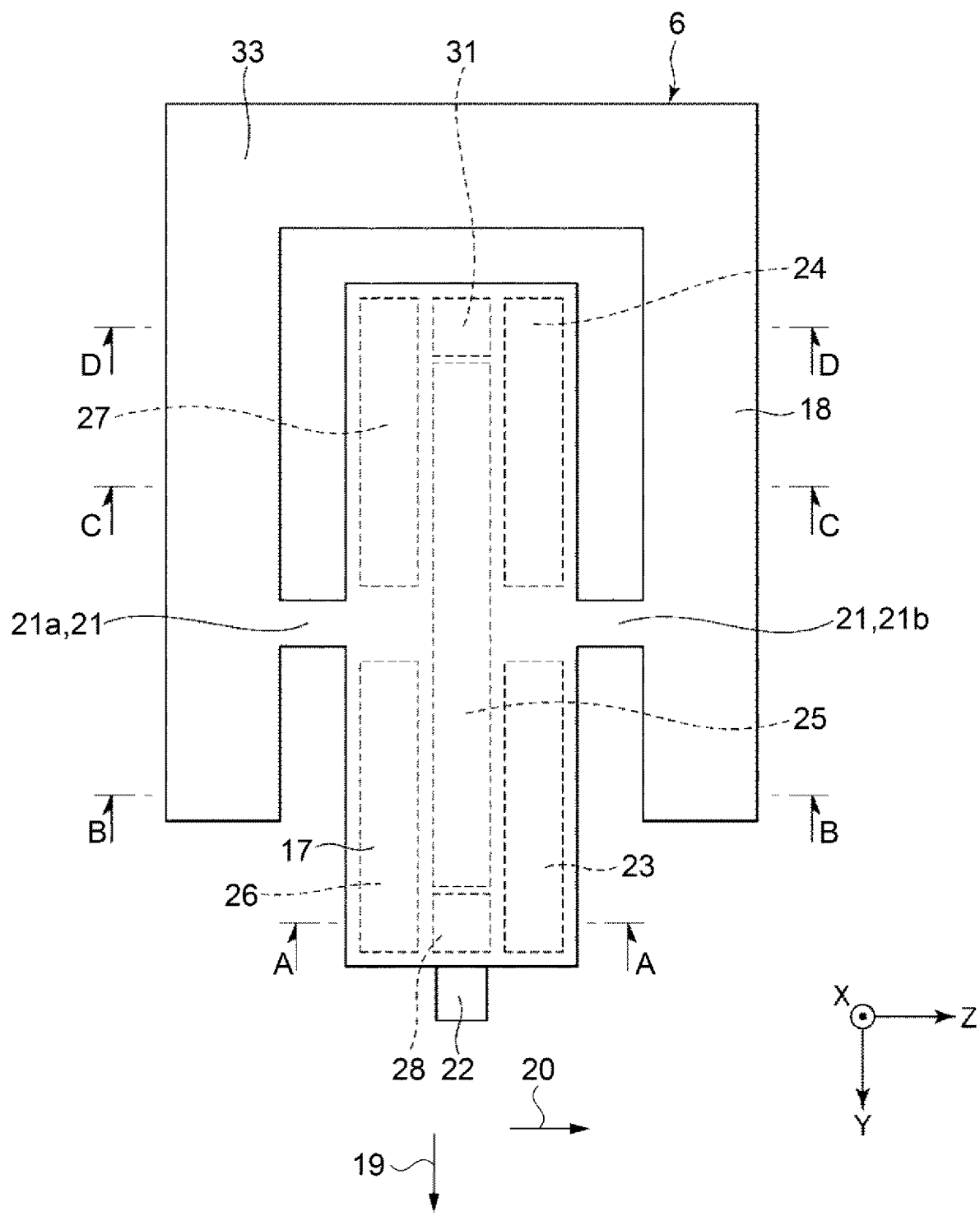
FIG. 2 is a plan view showing disposition of an electrode of a vibrating body included in a piezoelectric actuator shown in FIG. 1.
Figure 3:
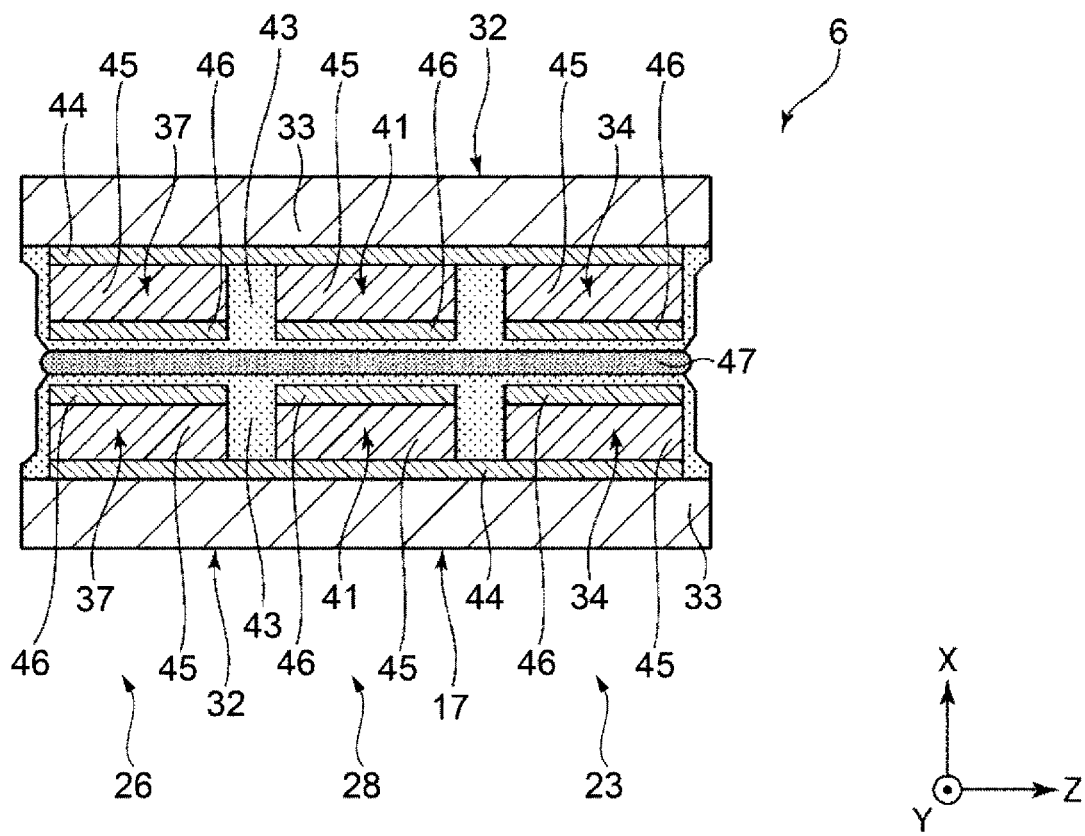
FIG. 3 is an A-A line sectional view of FIG. 2.
Figure 4:
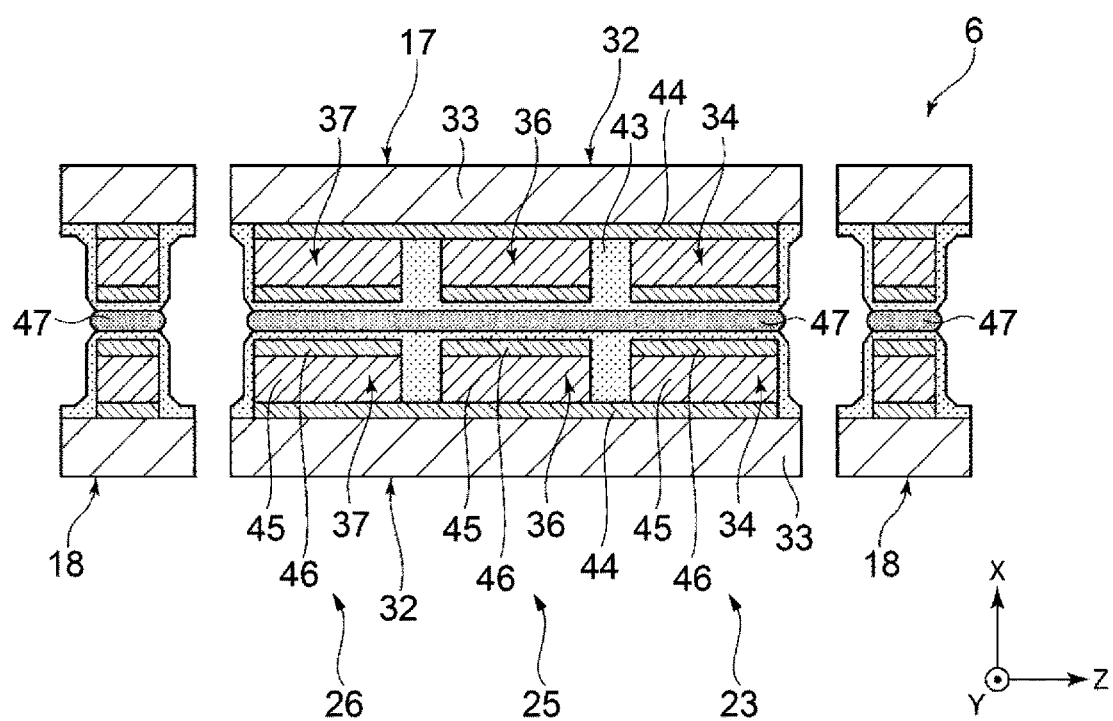
FIG. 4 is a B-B line sectional view of FIG. 2.
Figure 5:
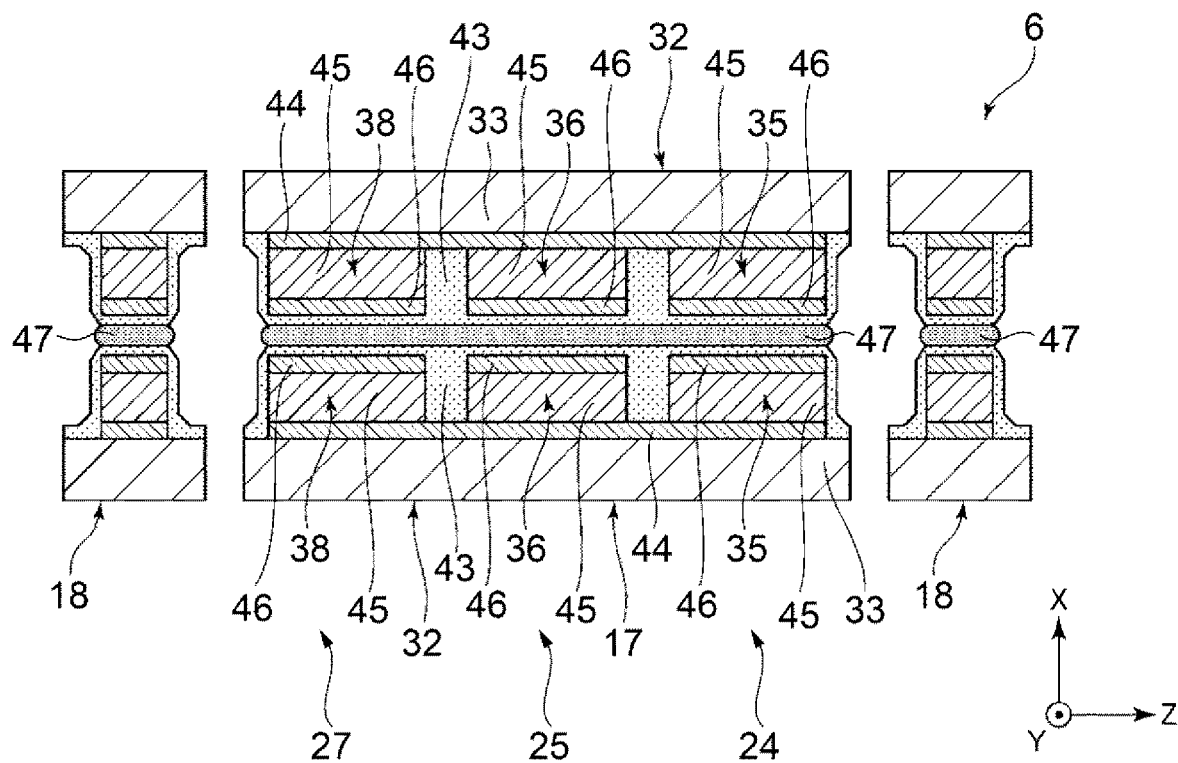
FIG. 5 is a C-C line sectional view of FIG. 2.
Figure 6:
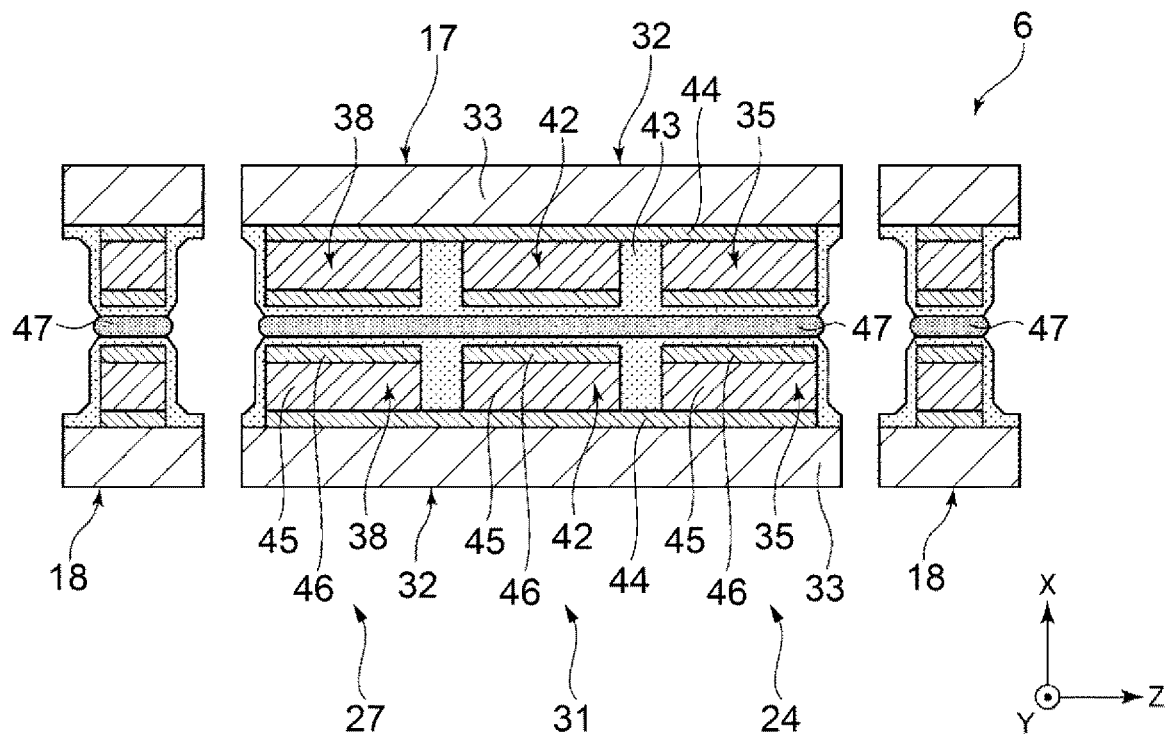
FIG. 6 is a D-D line sectional view of FIG. 2.

FIG. 1 is a plan view showing the piezoelectric driving device according to the first embodiment. FIG. 2 is a plan view showing disposition of an electrode of a vibrating body included in a piezoelectric actuator shown in FIG. 1. FIG. 3 is an A-A line sectional view of FIG. 2. FIG. 4 is a B-B line sectional view of FIG. 2. FIG. 5 is a C-C line sectional view of FIG. 2. FIG. 6 is a D-D line sectional view of FIG. 2.

In the following explanation, for convenience of explanation, three axes orthogonal to one another are represented as an X axis, a Y axis, and a Z axis. An arrow side of the axes is referred to as "plus side" as well and the opposite side of the arrows is referred to as "minus side" as well. Further, in the following explanation, the plus side of the X axis is referred to as "upper" and the minus side of the X axis is referred to as "lower".

As shown in FIG. 1, a piezoelectric motor 1 functioning as the piezoelectric driving device includes a rotor 2 functioning as a section to be driven and a driving section 3. The rotor 2 is formed in a disk shape and is capable of rotating around a center axis 4. The driving section 3 is in contact with an outer circumferential surface 5 of the rotor 2 and rotates the rotor 2 around the center axis 4.

The driving section 3 includes a piezoelectric actuator 6, an urging member 7, and a control device 8. The urging member 7 urges the piezoelectric actuator 6 toward the rotor 2. The control device 8 controls driving of the piezoelectric actuator 6. In such a piezoelectric motor 1, the piezoelectric actuator 6 bending-vibrates. The bending vibration is transmitted to the rotor 2. The rotor 2 rotates around the center axis 4.

The configuration of the piezoelectric motor 1 is not limited to the configuration in this embodiment. For example, a plurality of driving sections 3 may be disposed along the circumferential direction of the rotor 2. The rotor 2 may be rotated by driving of the plurality of driving sections 3. The driving section 3 may be in contact with a principal plane 11 of the rotor 2 rather than the outer circumferential surface 5 of the rotor 2. The principal plane 11 is a surface facing the axial direction of the center axis 4.

The section to be driven is not limited to a rotating body such as a rotor 2 and may be, for example, a linearly moving slider.

An encoder 12 is provided in the rotor 2. The rotation angle and the angular velocity of the rotor 2 are detected by the encoder 12. The type of the encoder 12 is not particularly limited. For example, the encoder 12 may be an incremental-type encoder that detects the rotation angle of the rotor 2 during the rotation of the rotor 2 or may be an absolute-type encoder that detects the absolute position from the origin of the rotor 2 irrespective of whether the rotor 2 rotates.

The encoder 12 includes a scale 13 fixed to the upper surface of the rotor 2 and an optical element 14 provided on the upper side of the scaler 13. The scale 13 is formed in a disk shape. A not-shown pattern is provided on the upper surface of the scale 13. On the other hand, the optical element 14 includes a light emitting element 15 that irradiates light toward the pattern of the scale 13 and an imaging element 16 that images the pattern of the scale 13. The encoder 12 having such a configuration can detect the rotation angle, the angular velocity, the absolute position, and the like of the rotor 2 by performing template matching of an image of the pattern acquired by the imaging element 16. However, the configuration of the encoder 12 is not limited to the configuration explained above. For example, the encoder 12 may include, instead of the imaging element 16, a light receiving element that receives light reflected or transmitted by the scale 13.

As shown in FIGS. 1 and 2, the piezoelectric actuator 6 includes a vibrating body 17, a supporting section 18, and coupling sections 21. The supporting section 18 supports the vibrating body 17. The coupling sections 21 couple the vibrating body 17 and the supporting section 18. A projection 22 in contact with the rotor 2 is provided in the vibrating body 17. The projection 22 transmits the vibration of the vibrating body 17 to the rotor 2. A direction in which the projection 22 projects from the vibrating body 17 is a first direction 19. A second direction 20 is a direction orthogonal to the first direction 19.

The vibrating body 17 is formed in a plate shape expanding on a Y-Z plane including the Y axis and the Z axis. The vibrating body 17 bending-vibrates in an S shape by bending while extending and contracting along the Y axis. In a plan view from a position along the X axis, the vibrating body 17 is formed in a longitudinal shape having a long axis parallel to the Y axis. The vibrating body 17 stretching-vibrates along the Y axis. In other words, the vibrating body 17 performs the stretching vibration of extending and contracting in the first direction 19 and the bending vibration of bending in the second direction 20. However, the shape of the vibrating body 17 is not particularly limited as long as the vibrating body 17 can exert the function of the vibrating body 17.

The vibrating body 17 includes a first piezoelectric element 23 to a fifth piezoelectric element 27 functioning as piezoelectric elements for driving and a sixth piezoelectric element 28 and a seventh piezoelectric element 31 functioning as piezoelectric elements for detection for detecting the vibration of the vibrating body 17.

The third piezoelectric element 25 is disposed in the center along the Z axis of the vibrating body 17 and is formed in a shape having a long axis parallel to the Y axis. The first piezoelectric element 23 and the second piezoelectric element 24 are disposed side by side along the Y axis on the Z-axis plus side of the third piezoelectric element 25. The fourth piezoelectric element 26 and the fifth piezoelectric element 27 are disposed side by side along the Y axis on the Z-axis minus side of the third piezoelectric element 25. The first piezoelectric element 23 to the fifth piezoelectric element 27 respectively extend and contract along the Y axis by energization. The first piezoelectric element 23 and the fifth piezoelectric element 27 are electrically coupled to each other. The second piezoelectric element 24 and the fourth piezoelectric element 26 are electrically coupled to each other.

It is possible to cause the vibrating body 17 to bending-vibrate in an S shape on the Y-Z plane by applying driving signals having different phases and having the same frequency respectively to the third piezoelectric element 25, the first piezoelectric element 23, and the fifth piezoelectric element 27 and to the second piezoelectric element 24 and the fourth piezoelectric element 26 and shifting timing of extension and contraction. The driving signals are alternating voltages.

The sixth piezoelectric element 28 is located on the Y-axis plus side of the third piezoelectric element 25. The seventh piezoelectric element 31 is located on the Y-axis plus side of the third piezoelectric element 25. The sixth piezoelectric element 28 and the seventh piezoelectric element are electrically coupled to each other. The sixth piezoelectric element 28 and the seventh piezoelectric element 31 receive external forces corresponding to vibrations of the vibrating body 17 involved in the driving of the first piezoelectric element 23 to the fifth piezoelectric element 27 and output signals corresponding to the received external forces. Accordingly, it is possible to detect a vibration state of the vibrating body 17 based on the signals output from the sixth piezoelectric element 28 and the seventh piezoelectric element 31.

The coupling sections 21 couple portions functioning as nodes of the bending vibration of the vibrating body 17 and the supporting section 18. Specifically, the coupling sections 21 couple the center along the Y axis of the vibrating body 17 and the supporting section 18. The coupling sections 21 include a first coupling section 21a located on the Z-axis minus side with respect to the vibrating body 17 and a second coupling section 21b located on the Z-axis plus side with respect to the vibrating body 17. In this way, the coupling sections 21 couple the vibrating body 17 and the supporting section 18.

The vibrating body 17, the supporting section 18, and the coupling section 21 have a configuration in which two piezoelectric element units 32 are opposed and stuck to each other as shown in FIGS. 3 to 6. The piezoelectric element units 32 include substrates 33, eleventh piezoelectric elements 34 to fifteenth piezoelectric elements 38 for driving and sixteenth piezoelectric elements 41 and seventeenth piezoelectric elements 42 for detection disposed on the substrate 33, and protection layers 43 that cover the eleventh piezoelectric elements 34 to the seventeenth piezoelectric elements 42.

The eleventh piezoelectric elements 34 to the seventeenth piezoelectric elements 42 respectively include first electrodes 44, piezoelectric bodies 45, and second electrodes 46. The first electrodes 44 are disposed on the substrates 33 and provided in common to the eleventh piezoelectric elements 34 to the seventeenth piezoelectric elements 42. The piezoelectric bodies 45 are disposed on the first electrodes 44 and individually provided in the eleventh piezoelectric elements 34 to the seventeenth piezoelectric elements 42. The second electrodes 46 are disposed on the piezoelectric bodies 45 and individually provided in the eleventh piezoelectric elements 34 to the seventeenth piezoelectric elements 42.

The two piezoelectric element units 32 are joined via an adhesive 47 in a state in which the eleventh piezoelectric elements 34 to the seventeenth piezoelectric elements 42 are opposed to each other. The first electrodes 44 of the piezoelectric element units 32 are electrically coupled via not-shown wires or the like. The second electrodes 46 of the piezoelectric element units 32 are electrically coupled via not-shown wires or the like.

As explained above, one first piezoelectric element 23 is configured from two piezoelectric elements 34 disposed to be opposed to each other. The same applies to the twelfth piezoelectric elements 35 to the seventeenth piezoelectric elements 42. The second piezoelectric element 24 is configured from two twelfth piezoelectric elements 35. The third piezoelectric element 25 is configured from two thirteenth piezoelectric elements 36. The fourth piezoelectric element 26 is configured from two fourteenth piezoelectric elements 37. The fifth piezoelectric element 27 is configured from two fifteenth piezoelectric elements 38. The sixth piezoelectric element 28 is configured from two sixteenth piezoelectric elements 41. The seventh piezoelectric element 31 is configured from two seventeenth piezoelectric elements 42.

The constituent material of the piezoelectric body 45 is not particularly limited. Piezoelectric ceramics such as lead zirconate titanate, barium titanate, lead titanate, potassium niobate, lithium niobate, lithium tantalate, sodium tungstate, zinc oxide, barium strontium titanate, strontium bismuth tantalate, lead metaniobate, and lead scandium niobate can be used. As the piezoelectric body 45, besides the piezoelectric ceramics, polyvinylidene fluoride, quartz, and the like may be used. An abbreviation of lead zirconate titanate is PZT. An abbreviation of barium strontium titanate is BST. An abbreviation of strontium bismuth tantalate is SBT.

A method of forming the piezoelectric body 45 is not particularly limited. The piezoelectric body 45 may be formed from a bulk material or may be formed using a sol-gel method or a sputtering method. In this embodiment, the piezoelectric body 45 is formed using the sol-gel method. Consequently, for example, a thin piezoelectric body 45 is obtained compared with when the piezoelectric body 45 is formed of a bulk material. It is possible to achieve a reduction in the thickness of the driving section 3.

The projection 22 is provided at the distal end portion of the vibrating body 17 and projects to the Y-axis plus side from the vibrating body 17. The distal end portion of the projection 22 is in contact with the outer circumferential surface 5 of the rotor 2. Accordingly, the vibration of the vibrating body 17 is transmitted to the rotor 2 via the projection 22.

Figure 7:
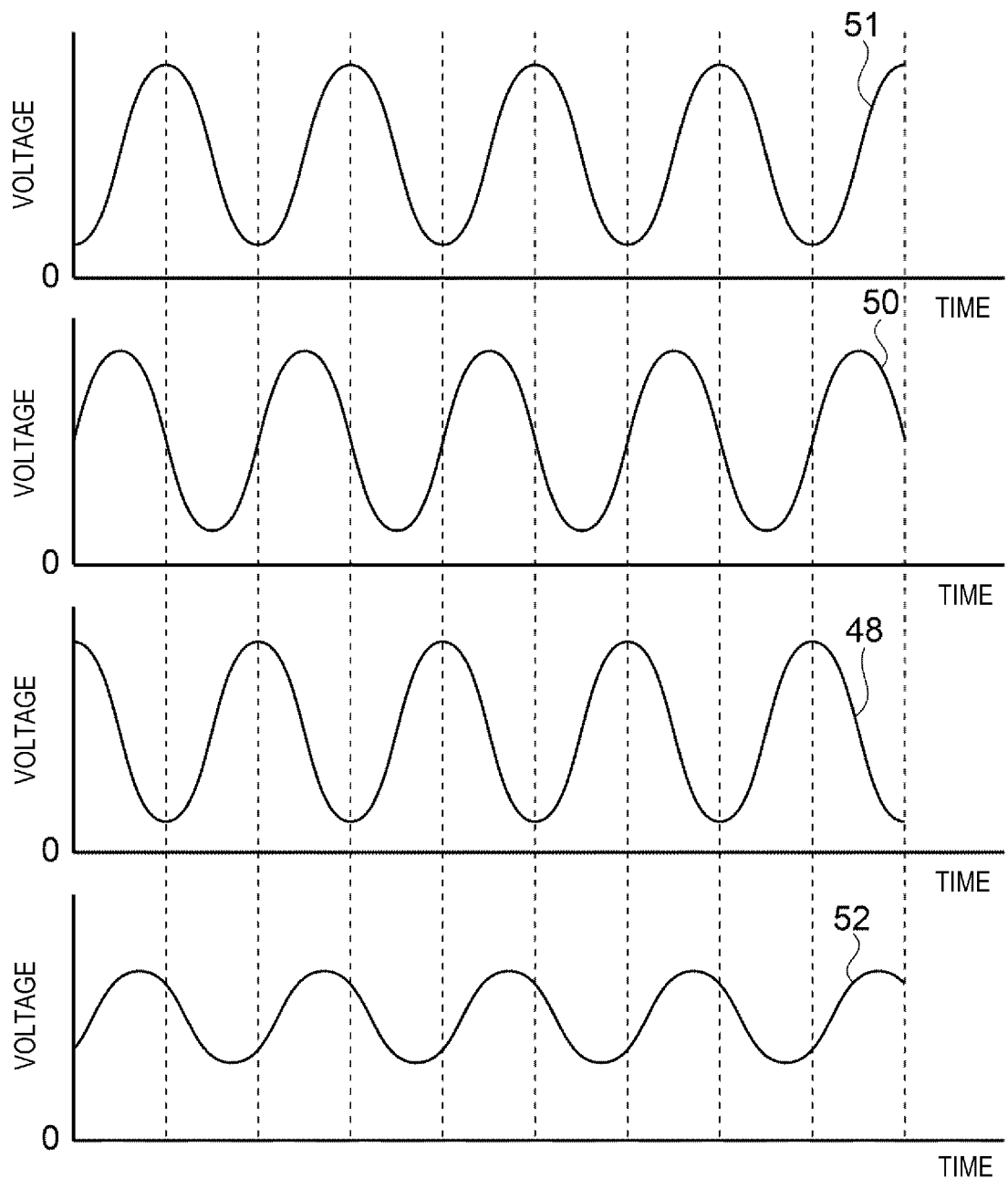
FIG. 7 is a diagram for explaining a driving signal.

FIG. 7 is a diagram for explaining driving signals. The horizontal axis indicates transition of time. The time transitions from the left side to the right side in FIG. 7. The vertical axis indicates voltage. The voltage is higher on the upper side than the lower side in FIG. 7. A first driving signal 48, a second driving signal 50, and a third driving signal 51, all of which are the driving signals, indicate driving signals applied to the piezoelectric elements of the vibrating body 17 by the control device 8. The first driving signal 48, the second driving signal 50, and the third driving signal 51 are periodic signals, frequencies and amplitudes of which are the same and phases of which are different from one another. On the other hand, as explained below, these periodic signals are intermittently generated and applied according to necessity. A pickup signal 52 is a voltage signal output from the sixth piezoelectric element 28 and the seventh piezoelectric element 31.

Figure 9:
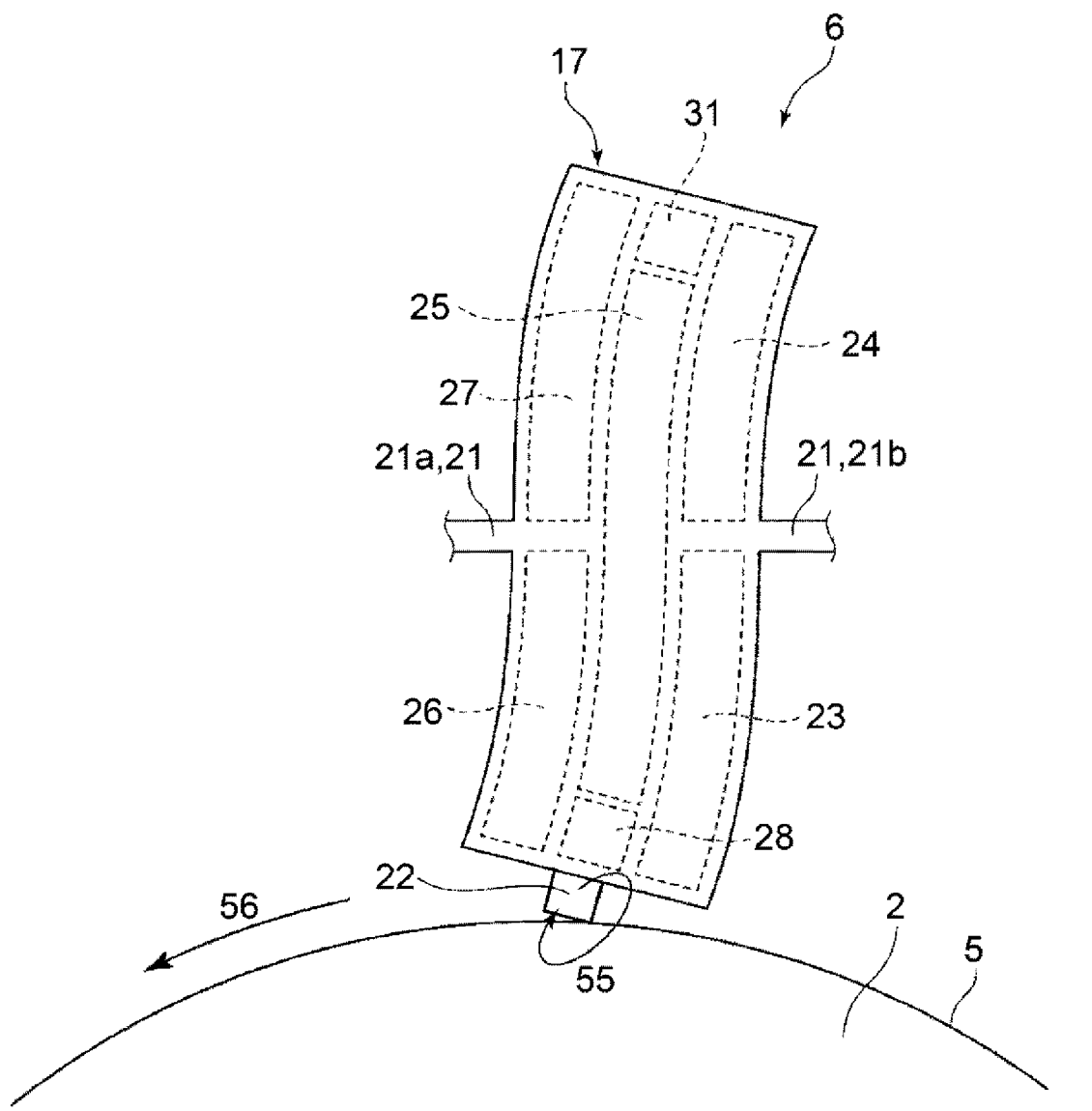
FIG. 9 is a schematic plan view for explaining a driving state of the piezoelectric actuator.

FIGS. 8 and 9 are schematic plan views for explaining a driving state of the piezoelectric actuator.

The first driving signal 48 is applied to the first piezoelectric element 23 and the fifth piezoelectric element 27. The second driving signal 50 is applied to the third piezoelectric element 25. The third driving signal 51 is applied to the second piezoelectric element 24 and the fourth piezoelectric element 26. At this time, as shown in FIG. 8, the vibrating body 17 bending-vibrates in an S shape while stretching-vibrating along the Y axis. The stretching vibration and the bending vibration are combined. The distal end of the projection 22 performs an elliptical motion to draw an elliptical track counterclockwise as indicated by a first arrow 53. The outer circumferential surface 5 of the rotor 2 moves according to such an elliptical motion of the projection 22. The rotor 2 rotates clockwise as indicated by a second arrow 54. The pickup signal 52 is output from the sixth piezoelectric element 28 and the seventh piezoelectric element 31 according to such vibration of the vibrating body 17.

On the other hand, the first driving signal 48 and the third driving signal 51 are switched. That is, the first driving signal 48 is applied to the second piezoelectric element 24 and the fourth piezoelectric element 26. The second driving signal 50 is applied to the third piezoelectric element 25. The third driving signal 51 is applied to the first piezoelectric element 23 and the fifth piezoelectric element 27. At this time, as shown in FIG. 9, the vibrating body 17 bending-vibrates in an S shape while stretching-vibrating along the Y axis. The stretching vibration and the bending vibration are combined. The projection 22 performs an elliptical motion to draw an elliptical track clockwise as indicated by a third arrow 55. The outer circumferential surface 5 of the rotor 2 moves according to such an elliptical motion of the projection 22. The rotor 2 rotates counterclockwise as indicated by a fourth arrow 56. The pickup signal 52 is output from the sixth piezoelectric element 28 and the seventh piezoelectric element 31 according to such vibration of the vibrating body 17.

As explained above, the vibrating body 17 bending-vibrates according to extension and contraction of the first piezoelectric element 23, the second piezoelectric element 24, the fourth piezoelectric element 26, and the fifth piezoelectric element 27 and sends the rotor 2 in the direction of the second arrow 54 or the fourth arrow 56. The amplitudes of the first driving signal 48 and the third driving signal 51 applied to the first piezoelectric element 23, the second piezoelectric element 24, the fourth piezoelectric element 26, and the fifth piezoelectric element 27 are controlled and the amplitude along the Z axis of the projection 22 is controlled. The angular velocity of the rotor 2 can be controlled by this control.

Specifically, if the amplitudes of the first driving signal 48 and the third driving signal 51 are increased, the amplitude along the Z axis of the projection 22 increases and the driving speed of the rotor 2 increases. Conversely, if the amplitudes of the first driving signal 48 and the third driving signal 51 are reduced, the amplitude along the Z axis of the projection 22 decreases and the driving speed of the rotor 2 decreases. In this way, the rotor 2 can be driven by the vibration of the vibrating body 17.

If the rotor 2 can be rotated at least in one direction, patterns of the driving signals applied to the first piezoelectric element 23 to the fifth piezoelectric element 27 are not particularly limited.

The control device 8 controls the driving of the driving section 3 by applying any one of the first driving signal 48, the second driving signal 50, and the third driving signal 51, which are alternating voltages, to the first piezoelectric element 23 to the fifth piezoelectric element 27. In the following explanation, for convenience of explanation, as shown in FIG. 8, the rotation of the rotor 2 in the direction of the second arrow 54 is representatively explained. When the rotor 2 is rotated in the direction of the fourth arrow 56 as shown in FIG. 9, explanation of the rotation is omitted because the rotation is the same as the rotation of the rotor 2 in the direction of the second arrow 54.

Figure 10:
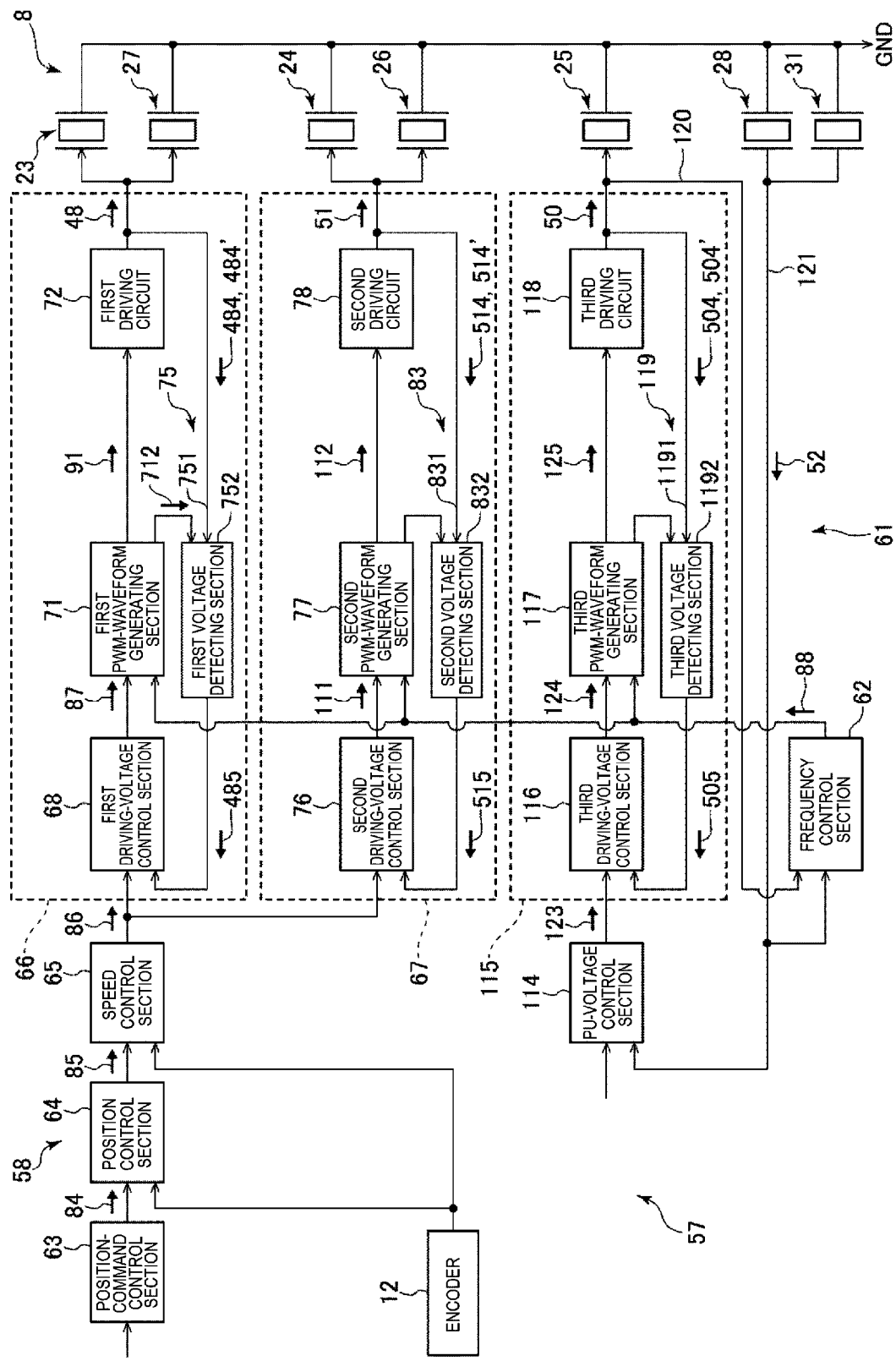
FIG. 10 is an electric circuit diagram of a piezoelectric motor.
Figure 11:
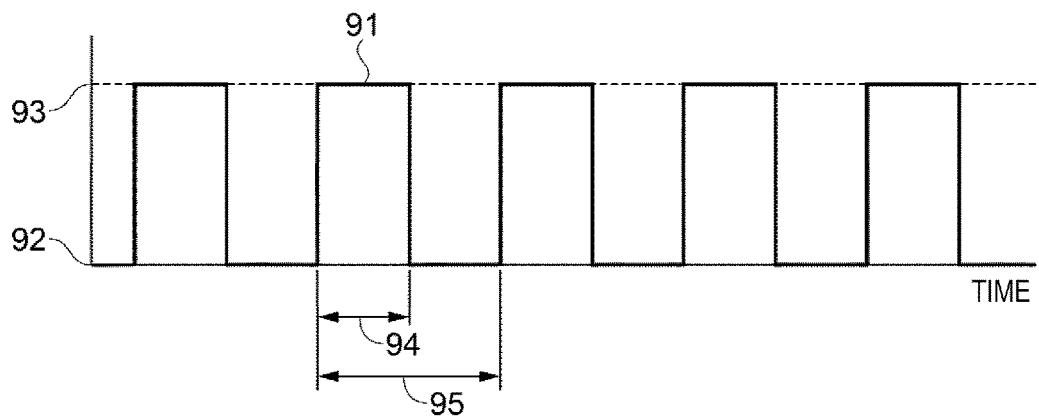
FIG. 11 is a diagram for explaining a pulse duty ratio of a pulse signal.
Figure 12:
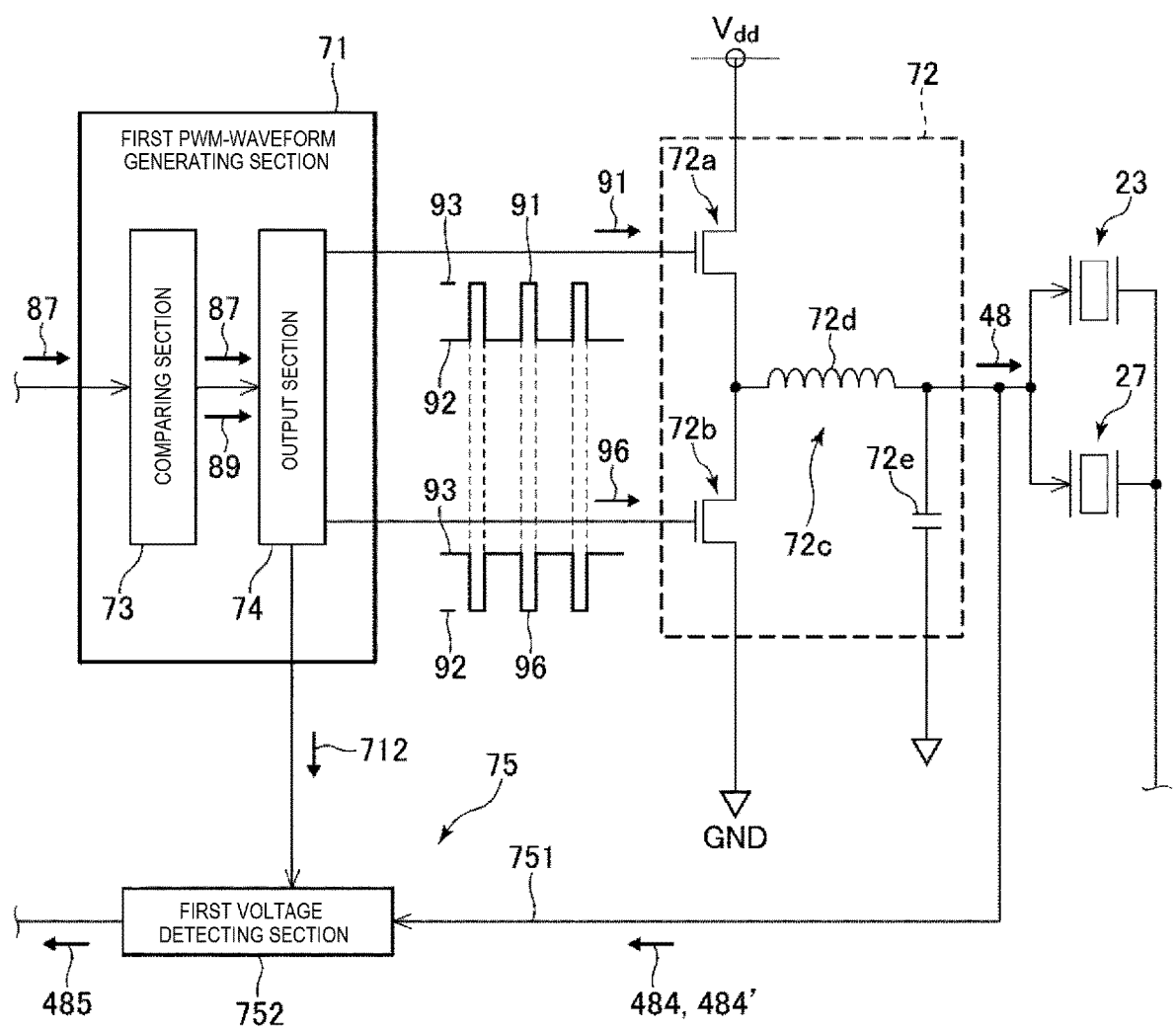
FIG. 12 is a circuit diagram showing a first PWM-waveform generating section and a first driving circuit.

FIG. 10 is an electric circuit diagram of the piezoelectric motor. FIG. 11 is a diagram for explaining a pulse duty ratio of a pulse signal. FIG. 12 is a circuit diagram showing a first PWM-waveform generating section and a first driving circuit.

As shown in FIG. 10, the control device 8 includes a voltage control section 57. The voltage control section 57 generates the first driving signal 48, the second driving signal 50, and the third driving signal 51.

The voltage control section 57 includes a first voltage control section 58, a second voltage control section 61, and a frequency control section 62. The first voltage control section 58 applies the first driving signal 48 to the first piezoelectric element 23 and the fifth piezoelectric element 27. Further, the first voltage control section 58 applies the third driving signal 51 to the second piezoelectric element 24 and the fourth piezoelectric element 26 to cause the vibrating body 17 to bending-vibrate. The second voltage control section 61 applies the second driving signal 50 to the third piezoelectric element 25 to cause the vibrating body 17 to stretching-vibrate along the Y axis. The frequency control section 62 controls the frequencies of the first driving signal 48, the second driving signal 50, and the third driving signal 51.

The voltage control section 57 controls the driving speed of the rotor 2 by changing the amplitudes of the first driving signal 48 and the third driving signal 51 such that the rotor 2 is located in target positions at respective times. Consequently, the piezoelectric motor 1 can suppress positional deviation of the rotor 2 with respect to the target positions at the respective times. Therefore, the piezoelectric motor 1 can have an excellent driving characteristic.

The first voltage control section 58 includes a position-command control section 63, a position control section 64, a speed control section 65, a first driving-signal generating section 66, and a second driving-signal generating section 67. The first driving-signal generating section 66 is a circuit that generates the first driving signal 48. The second driving-signal generating section 67 is a circuit that generates the third driving signal 51. The position-command control section 63, the position control section 64, and the speed control section 65 are coupled in this order. The first driving-signal generating section 66 and the second driving-signal generating section 67 are electrically coupled to the speed control section 65.

The first driving-signal generating section 66 includes a first driving-voltage control section 68 functioning as a pulse-duty-ratio-signal generating section, a first PWM-waveform generating section 71 functioning as a pulse-signal generating section, and a first driving circuit functioning as a driving circuit. The first driving-voltage control section 68 is electrically coupled to the speed control section 65. PWM is Pulse Width Modulation. Further, the first PWM-waveform generating section 71 includes a comparing section 73 and an output section 74 explained below. The first PWM-waveform generating section 71 generates a first pulse signal 91 and a first inverted pulse signal 96 and makes the first pulse signal 91 and the first inverted pulse signal 96 intermittent according to necessity. In the figures other than FIG. 12, illustration of the first inverted pulse signal 96 is omitted. Similarly, in this specification and the figures, explanation and illustration are also omitted about an inverted signal of a second pulse signal 112 and an inverted signal of a third pulse signal 125 explained below.

An output of the speed control section 65 is input to the first driving-voltage control section 68. A signal output by the first driving-voltage control section 68 is output to the comparing section 73 of the first PWM-waveform generating section 71. A signal output by the comparing section 73 is input to the output section 74. Further, a signal output by the output section 74 is input to the first driving circuit 72. The first driving signal 48 output by the first driving circuit 72 is applied to the first piezoelectric element 23 and the fifth piezoelectric element 27. A circuit that outputs output period voltage amplitude 484 explained below generated in the first piezoelectric element 23 and the fifth piezoelectric element 27 to the first driving-voltage control section 68 is a first feedback circuit 75. The first feedback circuit 75 includes a wire 751, which couples the first piezoelectric element 23 and the fifth piezoelectric element 27 to the first driving-voltage control section 68, and a first voltage detecting section 752. The first voltage detecting section 752 detects the output period voltage amplitude 484 generated in the first piezoelectric element 23 and the fifth piezoelectric element 27 and, after performing necessary processing, outputs a voltage amplitude detection value 485, which is a result of the processing, to the first driving-voltage control section 68. In other words, the first feedback circuit 75 feedbacks the detected output period voltage amplitude 484 to the first driving-voltage control section 68. The first driving-signal generating section 66 includes the first feedback circuit 75 including such a first voltage detecting section 752.

The second driving-signal generating section 67 includes a second driving-voltage control section 76 functioning as a pulse-duty-ratio-signal generating section, a second PWM-waveform generating section 77 functioning as a pulse-signal generating section, and a second driving circuit functioning as a driving circuit. The second driving-voltage control section 76 is electrically coupled to the speed control section 65. Further, the second PWM-waveform generating section 77 includes a comparing section and an output section not shown in FIG. 10. The second PWM-waveform generating section 77 generates the second pulse signal 112 and makes the second pulse signal 112 intermittent according to necessity.

An output of the speed control section 65 is input to the second driving-voltage control section 76. A signal output by the second driving-voltage control section 76 is output to the comparing section of the second PWM-waveform generating section 77. A signal output by the comparing section is output to the output section. A signal output by the output section is output to the second driving circuit 78. The third driving signal 51 output by the second driving circuit 78 is output to the second piezoelectric element 24 and the fourth piezoelectric element 26. A circuit that outputs output period voltage amplitude 514 explained below generated in the second piezoelectric element 24 and the fourth piezoelectric element 26 to the second driving-voltage control section 76 is a second feedback circuit 83. The second feedback circuit 83 includes a wire 831, which couples the second piezoelectric element 24 and the fourth piezoelectric element 26 to the second driving-voltage control section 76, and a second voltage detecting section 832. The second voltage detecting section 832 detects output period voltage amplitude 514 generated in the second piezoelectric element 24 and the fourth piezoelectric element 26 and, after performing necessary processing, outputs a voltage amplitude detection value 515, which is a result of the processing, to the second driving-voltage control section 76. In other words, the second feedback circuit 83 feedbacks the detected output period voltage amplitude 514 to the second driving-voltage control section 76. The second driving-signal generating section 67 includes the second feedback circuit 83 including such a second voltage detecting section 832.

The frequency control section 62 is electrically coupled to the first PWM-waveform generating section 71, the second PWM-waveform generating section 77, and a third PWM-waveform generating section 117 explained below. A signal output by the frequency control section 62 is input to the first PWM-waveform generating section 71, the second PWM-waveform generating section 77, and the third PWM-waveform generating section 117.

The first voltage control section 58 inputs and feedbacks a signal output from the encoder 12 to the position control section 64 and the speed control section 65. The first voltage control section 58 controls the first driving signal 48 and the third driving signal 51 such that the rotor 2 is located in the target positions at the respective times.

The position-command control section 63 generates, based on a command of a not-shown host computer or the like, a position command 84 indicating the target positions of the rotor 2 and outputs the position command 84 to the position control section 64. The position control section 64 implements P control (Proportional) for performing proportional control for adjusting a proportional gain with respect to a deviation between the position command 84 and the present position of the rotor 2 detected by the encoder 12 and generates a speed command 85 indicating target speed of the rotor 2 for locating the rotor 2 in the positions based on the position command 84. The position control section 64 outputs the generated speed command 85 to the speed control section 65. The speed control section 65 implements PI control (Proportional Integral) for performing proportional control for adjusting a proportional gain with respect to a deviation between the speed command 85 generated by the position control section 64 and the present driving speed of the rotor 2 detected by the encoder 12 and integral control for adjusting an integral gain with respect to the deviation and generates a target driving signal 86 indicating a target driving voltage for driving the rotor 2 at driving speed based on the speed command 85. The speed control section 65 outputs the generated target driving signal 86 to the first driving-voltage control section 68 and the second driving-voltage control section 76.

The first driving-voltage control section 68 implements PI control for performing proportional control for adjusting a proportional gain with respect to a deviation between the target driving signal 86 and the voltage amplitude detection value 485 output from the first voltage detecting section 752 explained below and integral control for adjusting an integral gain with respect to the deviation and generates a first target pulse duty ratio signal 87 indicating a target pulse duty ratio for setting the first driving signal 48 to a voltage having amplitude based on the target driving signal 86. The target pulse duty ratio means a duty ratio that should be targeted by the first pulse signal 91 and the first inverted pulse signal 96 in order to generate the first driving signal 48 having the amplitude indicated by the target driving signal 86. In this way, the first driving-voltage control section 68 generates the first target pulse duty ratio signal 87 based on the input target driving signal 86.

The first PWM-waveform generating section 71 generates the first pulse signal 91 and the first inverted pulse signal 96 having the target pulse duty ratio based on the first target pulse duty ratio signal 87 and having a frequency based on a frequency command 88 generated by the frequency control section 62. The first driving circuit 72 generates the first driving signal 48 based on the first pulse signal 91 and the first inverted pulse signal 96. In other words, the first driving circuit 72 generates the first driving signal 48 using the first pulse signal 91 and the first inverted pulse signal 96 generated based on the first target pulse duty ratio signal 87. The first driving circuit 72 applies the first driving signal 48 generated in this way to the first piezoelectric element 23 and the fifth piezoelectric element 27.

FIG. 11 is a diagram for explaining a pulse duty ratio of a pulse signal. In the following explanation, of the first pulse signal 91 and the first inverted pulse signal 96, the first pulse signal 91 is representatively explained. Explanation of the first inverted pulse signal 96 is omitted because the first inverted pulse signal 96 is the same as the first pulse signal 91.

In FIG. 11, the horizontal axis indicates transition of time. The time transitions from the left side to the right side in FIG. 11. The vertical axis indicates a voltage. The voltage is higher on the upper side than the lower side in FIG. 11. The first pulse signal 91 is a pulse wave. The voltage of the first pulse signal 91 changes between a first pulse voltage 92 and a second pulse voltage 93. A pulse duty ratio of the first pulse signal 91 is obtained by dividing a pulse width 94 by a pulse period 95. The pulse duty ratio can be changed in a range of 0% to 50%. As the pulse duty ratio of the first pulse signal 91 is closer to 0%, the output period voltage amplitude 484 of the first driving signal 48 generated by the first driving circuit 72 is smaller. Conversely, as the pulse duty ratio of the first pulse signal 91 is closer to 50%, the output period voltage amplitude 484 of the first driving signal 48 generated by the first driving circuit 72 is larger. Accordingly, as the pulse duty ratio of the first pulse signal 91 is brought closer to 0%, the driving speed of the rotor 2 decreases. Conversely, as the pulse duty ratio of the first pulse signal 91 is brought closer to 50%, the driving speed of the rotor 2 increases.

When the pulse duty ratio of the first pulse signal decreases, a waveform of the first driving signal 48 generated by the first driving circuit 72 is deformed from a sine wave. In particular, in a region where the pulse duty ratio of the first pulse signal 91 is close to 0%, the problem is conspicuous. A cause of this problem is briefly explained.

As shown in FIG. 12, the first driving circuit 72 includes a first switching element 72a, a second switching element 72b, and an LC resonance circuit 72c, which are configured by MOSFETs or the like. The LC resonance circuit 72c includes a coil 72d and a capacitor 72e. The first pulse signal 91 is input to the first switching element 72a. The first inverted pulse signal 96 of the first pulse signal 91 is input to the second switching element 72b. The first switching element 72a is turned on when the first pulse signal 91 has the second pulse voltage 93. The first switching element 72a is turned off when the first pulse signal 91 has the first pulse voltage 92. The second switching element 72b is turned on when the first inverted pulse signal 96 has the second pulse voltage 93. The second switching element 72b is turned off when the first inverted pulse signal 96 has the first pulse voltage 92.

Figure 13:
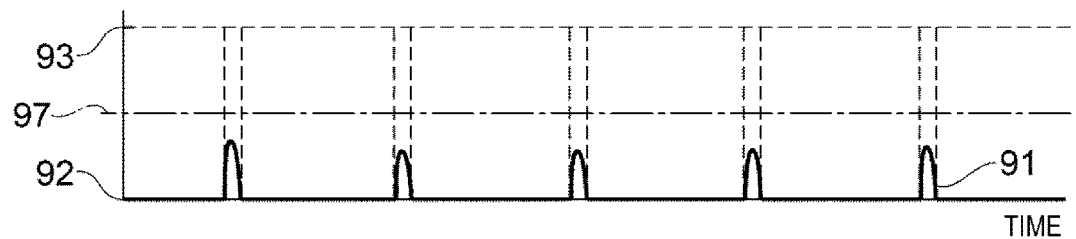
FIG. 13 is a diagram showing the pulse signal, the pulse duty ratio of which is too small.

FIG. 13 is a diagram showing the pulse signal, the pulse duty ratio of which is too small. In the following explanation, of the first pulse signal 91 and the first inverted pulse signal 96, the first pulse signal 91 is representatively explained. Explanation of the first inverted pulse signal 96 is omitted because the first inverted pulse signal 96 is the same as the first pulse signal 91.

A resistance component, a capacitance component, an induction component, and the like are included in wiring between the first PWM-waveform generating section 71 and the first driving circuit 72. Accordingly, as shown in FIG. 13, when the pules duty ratio of the first pulse signal 91 is close to 0%, the waveform of the first pulse signal 91 is deformed from an ideal pulse wave indicated by a broken line. A voltage value of the second pulse voltage 93 sometimes cannot exceed a switching voltage 97 for switching ON/OFF of the first switching element 72a and the second switching element 72b. When such waveform deformation occurs, the first switching element 72a and the second switching element 72b cannot be turned on and off at proper timings. As a result, the waveform of the first driving signal 48 changes to a deformed waveform of a sine wave.

Therefore, the first PWM-waveform generating section 71 according to this embodiment has a configuration in which the pulse duty ratio of the first pulse signal 91 is not excessively brought close to 0% in order to suppress deformation of the waveform of the first pulse signal 91. Specifically, a bending driving predetermined value is set in the comparing section 73 of the first PWM-waveform generating section 71 as a predetermined value for the target pulse duty ratio indicated by the first target pulse duty ratio signal 87. When the target pulse duty ratio indicated by the first target pulse duty ratio signal 87 is smaller than the bending driving predetermined value, the output section 74 of the first PWM-waveform generating section 71 outputs, respectively as intermittent signals, the first pulse signal 91 and the first inverted pulse signal 96 having the pulse duty ratio fixed to the bending driving predetermined value. When the first pulse signal 91 and the first inverted pulse signal 96 made intermittent are input to the first driving circuit 72, the first driving signal 48, which is an intermittently generated periodic signal, is output.

Figure 14:
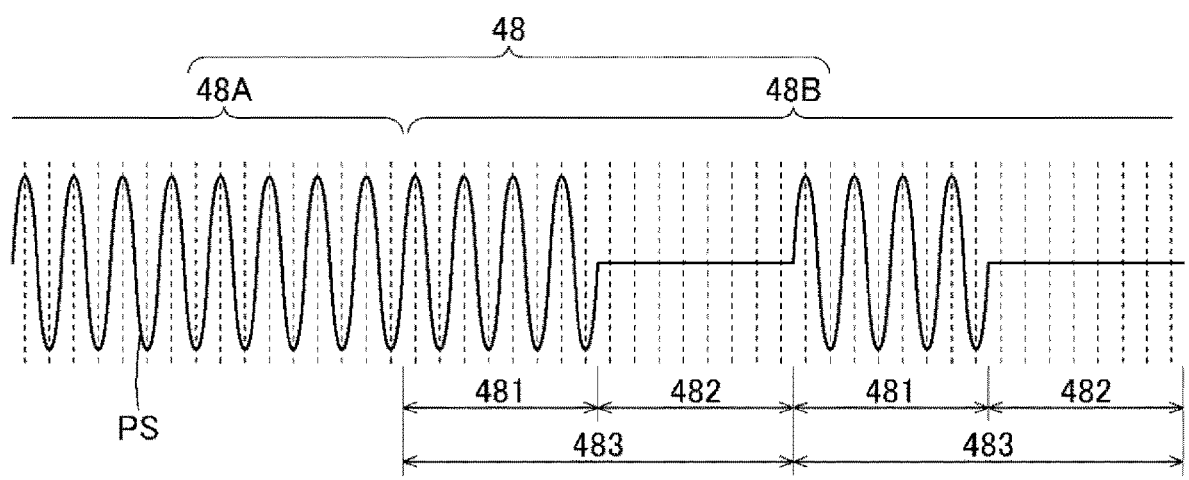
FIG. 14 is a diagram showing a driving signal including an intermittently generated periodic signal.

FIG. 14 is a diagram showing a driving signal including an intermittently generated periodic signal PS.

As shown in FIG. 14, when the first driving signal 48 is made intermittent, an average of the amplitude of the first driving signal 48 can be reduced. In FIG. 14, for convenience of explanation, the first driving signal 48 including a continuous signal 48A in which a waveform of the periodic signal PS such as a sine wave continues and an intermittent signal 48B in which the periodic signal PS is intermittent is illustrated. In other words, FIG. 14 is an example in which the continuous signal 48A changes to the intermittent signal 48B halfway.

The intermittent signal 48B repeatedly includes an intermittent cycle 483 including an output period 481, which is a period in which the periodic signal PS is output, and a suspension period 482, which is a period in which the output is suspended. Since the first driving signal 48 including such an intermittently generated intermittent signal 48B is applied to the first piezoelectric element 23 and the fifth piezoelectric element 27, an average of amplitude in the output period 481 can be regarded as amplitude in an entire intermittent cycle 483. Consequently, apparent amplitude of the first driving signal 48 can be reduced. The driving speed of the rotor 2 can be reduced.

When the first driving signal 48 is made intermittent in this way, the first pulse signal 91 and the first inverted pulse signal 96 can be fixed to the pulse duty ratio of the bending driving predetermined value. Accordingly, it is possible to suppress deformation of a waveform that occurs when the pulse duty ratio of the first pulse signal 91 and the first inverted pulse signal 96 is close to 0%. In other words, it is possible to suppress the deformation of the waveform by setting the bending driving predetermine value within a range of a pulse duty ratio in which deformation of the waveforms of the first pulse signal 91 and the first inverted pulse signal 96 is small. As a result, it is possible to stably drive the first piezoelectric element 23 and the fifth piezoelectric element 27 even at low speed and stably rotate the rotor 2 even in a state in which the driving speed is reduced. When the pulse duty ratio is fixed, the pulse duty ratio does not always need to be fixed to the bending driving predetermined value and may be fixed to a value higher than the bending driving predetermined value.

The bending driving predetermined value of the target pulse duty ratio set in the comparing section 73 of the first PWM-waveform generating section 71 can be set to, for example, approximately 5% or more and 30% or less and preferably set to approximately 10% or more and 20% or less. Consequently, it is possible to more stably drive the first piezoelectric element 23 and the fifth piezoelectric element 27 with the first driving signal 48, which is the intermittently generated periodic signal, while suppressing deformation of the waveforms of the first pulse signal 91 and the first inverted pulse signal 96. In this specification, driving a piezoelectric element with an intermittently generated periodic signal is referred to as "intermittent driving" as well.

In the first driving signal 48, which is the intermittently generated periodic signal, a value obtained by dividing the output period 481 by the intermittent cycle 483 is set as an intermittent duty ratio. In other words, the intermittent duty ratio is a ratio of the output period 481 to a total of the output period 481 and the suspension period 482. It is possible to adjust the apparent amplitude of the first driving signal 48 by changing the intermittent duty ratio. In other words, when the first driving signal 48 is changed to the intermittent signal 48B, the first driving-signal generating section 66 switches the intermittent duty ratio of the first driving signal 48 based on the target pulse duty ratio. Consequently, even when the first driving signal 48 is changed to the intermittent signal 48B, it is possible to control the driving speed of the rotor 2. Accordingly, it is possible to drive the rotor 2 at target driving speed even if the target driving speed is low speed.

A relation between the target pulse duty ratio and the intermittent duty ratio is not particularly limited and can be optionally set.

Figure 15:
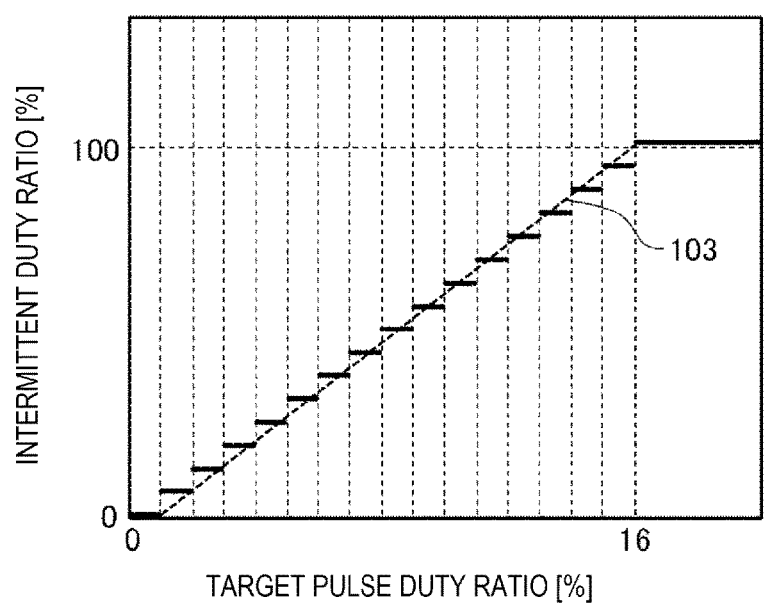
FIG. 15 is a graph showing an example of a relation between a target pulse duty ratio and an intermittent duty ratio.

FIG. 15 is a graph showing an example of the relation between the target pulse duty ratio and the intermittent duty ratio. The horizontal axis in FIG. 15 indicates the target pulse duty ratio and the vertical axis in FIG. 15 indicates the intermittent duty ratio.

FIG. 15 is an example in which the bending driving predetermined value for the target pulse duty ratio is set to 16%. In this example, when the target pulse duty ratio is smaller than 16%, the target pulse duty ratio and the intermittent duty ratio satisfy a proportional relation. A first correlation line 103 shown in FIG. 15 is a straight line representing a relation between the target pulse duty ratio and the intermittent duty ratio. As indicated by the first correlation line 103, it is possible to control the driving speed of the rotor 2 corresponding to the target pulse duty ratio by changing the intermittent duty ratio according to the target pulse duty ratio in a state in which the pulse duty ratio of the first pulse signal 91 and the first inverted pulse signal 96 is fixed to 16%. Consequently, it is possible to stably drive the first piezoelectric element 23 and the fifth piezoelectric element 27 even at low speed while suppressing deformation of the waveforms of the first pulse signal 91 and the first inverted pulse signal 96.

More specifically, in the example shown in FIG. 15, when the bending driving predetermined value is set to 16%, if the target pulse duty ratio is 16% or more, the intermittent duty ratio of the first pulse signal 91 and the first inverted pulse signal 96 is set to 100%. Consequently, the first driving signal 48, which is the bending driving signal, changes to a continuous signal 48A in which the periodic signal continues.

On the other hand, when the target pulse duty ratio is less than 16%, the first driving signal 48 changes to the intermittent signal 48B.

When the target pulse duty ratio is 15% or more and less than 16%, $^{15}/_{16}$ of the target pulse duty ratio of 0% to 16% only has to be set as the length of the output period 481 and $^{1}/_{16}$ of the target pulse duty ratio of 0% to 16% only has to be set as the length of the suspension period 482. Accordingly, the intermittent duty ratio in this case is calculated as ($^{15}/_{16}$)×100≈93.8%.

When the target pulse duty ratio is 14% or more and less than 15%, $^{14}/_{16}$ of the target pulse duty ratio of 0% to 16% only has to be set as the length of the output period 481 and $^{2}/_{16}$ of the target pulse duty ratio of 0% to 16% only has to be set as the length of the suspension period 482. Accordingly, the intermittent duty ratio in this case is calculated as ($^{14}/_{16}$)×100≈87.5%.

Further, when the target pulse duty ratio is 1% or more and less than 2%, $^{1}/_{16}$ of the target pulse duty ratio of 0% to 16% only has to be set as the length of the output period 481 and $^{15}/_{16}$ of the target pulse duty ratio of 0% to 16% only has to be set as the length of the suspension period 482. Accordingly, the intermittent duty ratio in this case is calculated as ($^{1}/_{16}$)×100≈6.3%.

When the target pulse duty ratio is less than 1%, the length of the output period 481 only has to be set to 0 to stop the bending driving.

When a relation between the target pulse duty ratio and the intermittent duty ratio is calculated based on the calculation explained above, the graph of FIG. 15 is obtained. When this relation is approximated by a straight line, the first correlation line 103 is obtained.

The frequency of the continuous signal 48A of the first driving signal 48, that is, the frequency of the periodic signal explained above is not particularly limited. However, as an example, the frequency is assumed to be 480 kHz. Then, an intermittent frequency of the intermittent signal 48B calculated as the inverse of the intermittent cycle 483 can be calculated as 480/16=30 kHz. If the intermittent frequency is this degree, the intermittent frequency exceeds 20 kHz, which is considered to be the upper limit value of the human audible frequency. Therefore, a noise problem involved in the driving due to the intermittent signal 48B less easily occurs.

When the first driving signal 48 is intermittent in the pattern explained above, the third driving signal 51 may also be intermittent in a pattern different from the pattern of the first driving signal 48. However, preferably, the third driving signal 51 is intermittent in the same pattern as the pattern of the first driving signal 48.

Figure 16:
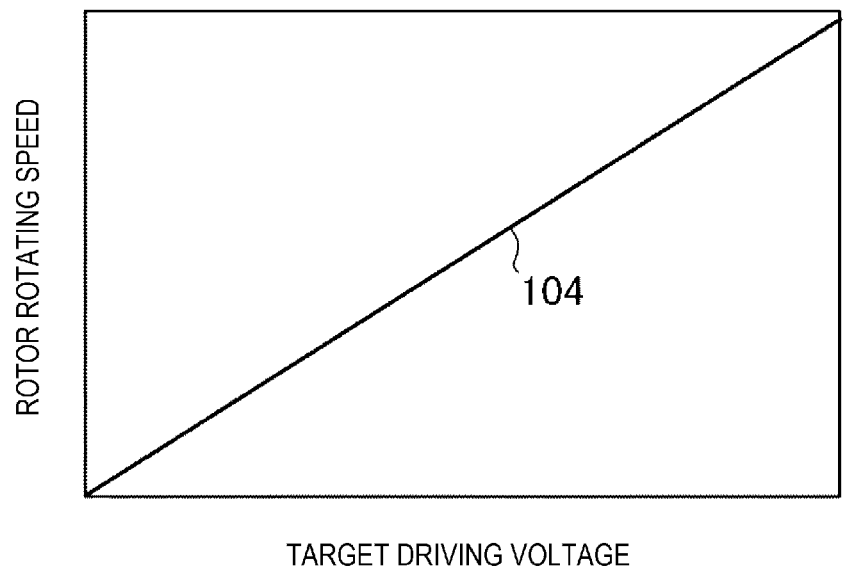
FIG. 16 is a graph showing an example of a relation between a target driving voltage indicated by a target driving signal and rotating speed of a rotor when the rotor is driven based on the relation between the target pulse duty ratio and the intermittent duty ratio shown in FIG. 15.

FIG. 16 is a graph showing an example of a relation between the target driving voltage indicated by the target driving signal 86 and rotating speed of the rotor 2 when the rotor 2 is driven based on the relation between the target pulse duty ratio and the intermittent duty ratio shown in FIG.

15. The horizontal axis in FIG. 16 indicates the target driving voltage and the vertical axis in FIG. 16 indicates the rotating speed of the rotor 2.

When the target pulse duty ratio is less than 16%, even if the intermittent signal 48B is used as the first driving signal 48, a fixed positive correlation is obtained between the target driving voltage and the rotating speed. A second correlation line 104 shown in FIG. 16 represents a relation between the target driving voltage and the rotating speed of the rotor 2. It is possible to make the rotating speed of the rotor 2 shown in FIG. 16 substantially proportional to the target driving voltage by using the intermittent driving explained above. Consequently, it is possible to drive the rotor 2 at target speed by changing the target driving voltage as appropriate. Therefore, it is possible to stably control the rotating speed of the rotor 2 in a wider speed range by using the intermittent signal 48B as the first driving signal 48.

Figure 17:
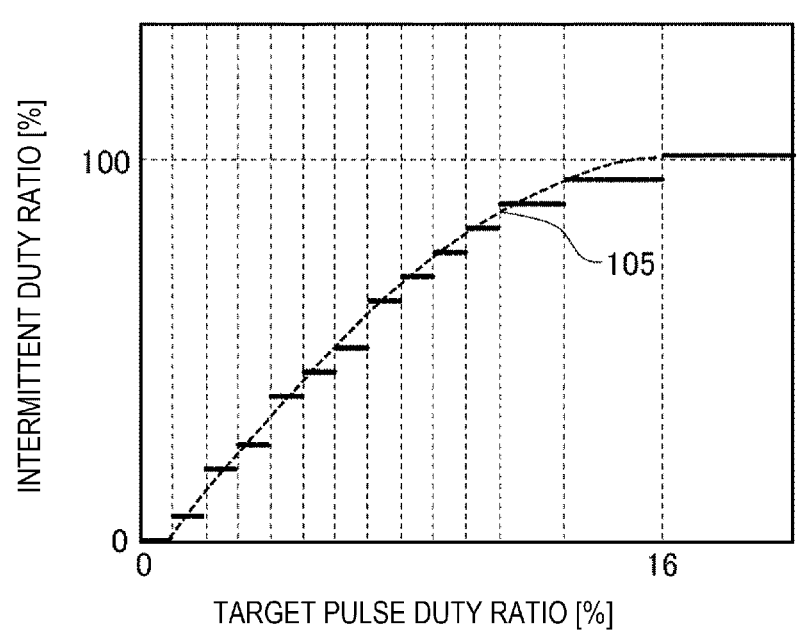
FIG. 17 is a graph showing another example of the relation between the target pulse duty ratio and the intermittent duty ratio.

FIG. 17 is a graph showing another example of the relation between the target pulse duty ratio and the intermittent duty ratio. The horizontal axis in FIG. 17 indicates the target pulse duty ratio and the vertical axis in FIG. 17 indicates the intermittent duty ratio.

In the example shown in FIG. 17, the bending driving predetermined value of the target pulse duty ratio is also set to 16%. In this example, when the target pulse duty ratio is smaller than 16%, the target pulse duty ratio and the intermittent duty ratio satisfy a positive correlation. However, a change ratio of the intermittent duty ratio to the target pulse duty ratio is not fixed but changes. A third correlation line 105 shown in FIG. 17 is a curve representing a relation between the target pulse duty ratio and the intermittent duty ratio.

More specifically, in the example shown in FIG. 17, when the bending driving predetermined value is set to 16%, if the target pulse duty ratio is 16% or more, the intermittent duty ratio of the first pulse signal 91 and the first inverted pulse signal 96 is set to 100%.

On the other hand, when the target pulse duty ratio is 13% or more and less than 16%, $^{15}/_{16}$ of the target pulse duty ratio of 0% to 16% only has to be set as the length of the output period 481 and $^{1}/_{16}$ of the target pulse duty ratio of 0% to 16% only has to be set as the length of the suspension period 482. Accordingly, the intermittent duty ratio in this case is calculated as $(^{15}/_{16}) \times 100 = 93.8\%$.

When the target pulse duty ratio is 11% or more and less than 13%, $^{14}/_{16}$ of the target pulse duty ratio of 0% to 16% only has to be set as the length of the output period 481 and $^{2}/_{16}$ of the target pulse duty ratio of 0% to 16% only has to be set as the length of the suspension period 482. Accordingly, the intermittent duty ratio in this case is calculated as $(^{14}/_{16}) \times 100 = 87.5\%$.

Further, when the target pulse duty ratio is 1% or more and less than 2%, $^{1}/_{16}$ of the target pulse duty ratio of 0% to 16% only has to be set as the length of the output period 481 and $^{15}/_{16}$ of the target pulse duty ratio of 0% to 16% only has to be set as the length of the suspension period 482. Accordingly, the intermittent duty ratio in this case is calculated as $(^{1}/_{16}) \times 100 = 6.3\%$.

When the target pulse duty ratio is smaller than 1%, the length of the output period 481 only has to be set to 0 to stop the bending driving.

When the relation between the target pulse duty ratio and the intermittent duty ratio is calculated based on the calculation explained above, the graph shown in FIG. 17 is obtained. When this relation is approximated by a curve, the third correlation line 105 is obtained.

When the first driving signal 48 includes the intermittent signal 48B explained above, the third driving signal 51 may include an intermittent signal under conditions different from the conditions of the first driving signal 48. However, preferably, the third driving signal 51 includes the same intermittent signal 48B.

As explained above, when the intermittent duty ratio of the first driving signal 48, which is the intermittently generated periodic signal, is calculated, the first driving-signal generating section 66 only has to calculate the intermittent duty ratio based on a conversion rule for conversion from the target pulse duty ratio. Examples of the conversion rule include a conversion table and a conversion formula representing the relation between the target pulse duty ratio and the intermittent duty ratio for drawing the first correlation line 103 and the third correlation line 105 explained above. By setting such a conversion rule in the output section 74 of the first PWM-waveform generating section 71, it is possible to easily calculate the intermittent duty ratio from the input target pulse duty ratio.

The first PWM-waveform generating section 71 of the first driving-signal generating section 66 may have a plurality of conversion rules and switch the conversion rules. For example, in the beginning of the use of the piezoelectric motor 1, a conversion rule based on the first correlation line 103 may be used. After the conversion rule based on the first correlation line 103 is used for a fixed time, the conversion rule based on the first correlation line 103 may be switched to a conversion rule based on the third correlation line 105, which is another conversion rule. The intermittent duty ratio may be calculated based on the conversion rule after the switching. Consequently, if a change over time is likely to occur in the vibrating body 17 and the projection 22, it is possible to, anticipating the change, select and apply a conversion rule to prevent the influence by the change from becoming obvious. Accordingly, even when the change overtime occurs, it is possible to drive the rotor 2 at target speed.

The first voltage detecting section 752 has a function of an A/D converter (analog digital converter) that detects the output period voltage amplitude 484 of the first driving signal 48, in other words, the magnitude of a voltage change that occurs in electrodes of the first piezoelectric element 23 and the fifth piezoelectric element 27. The first voltage detecting section 752 calculates an average of the detected output period voltage amplitude 484 and feedbacks a result of the calculation to the first driving-voltage control section 68 as the voltage amplitude detection value 485. It is possible to calculate an average voltage of the output period voltage amplitude 484, which is the periodic signal, by calculating the average and perform driving control considering the deviation from the target driving signal 86 in the first driving-voltage control section 68 as explained above.

Figure 18:
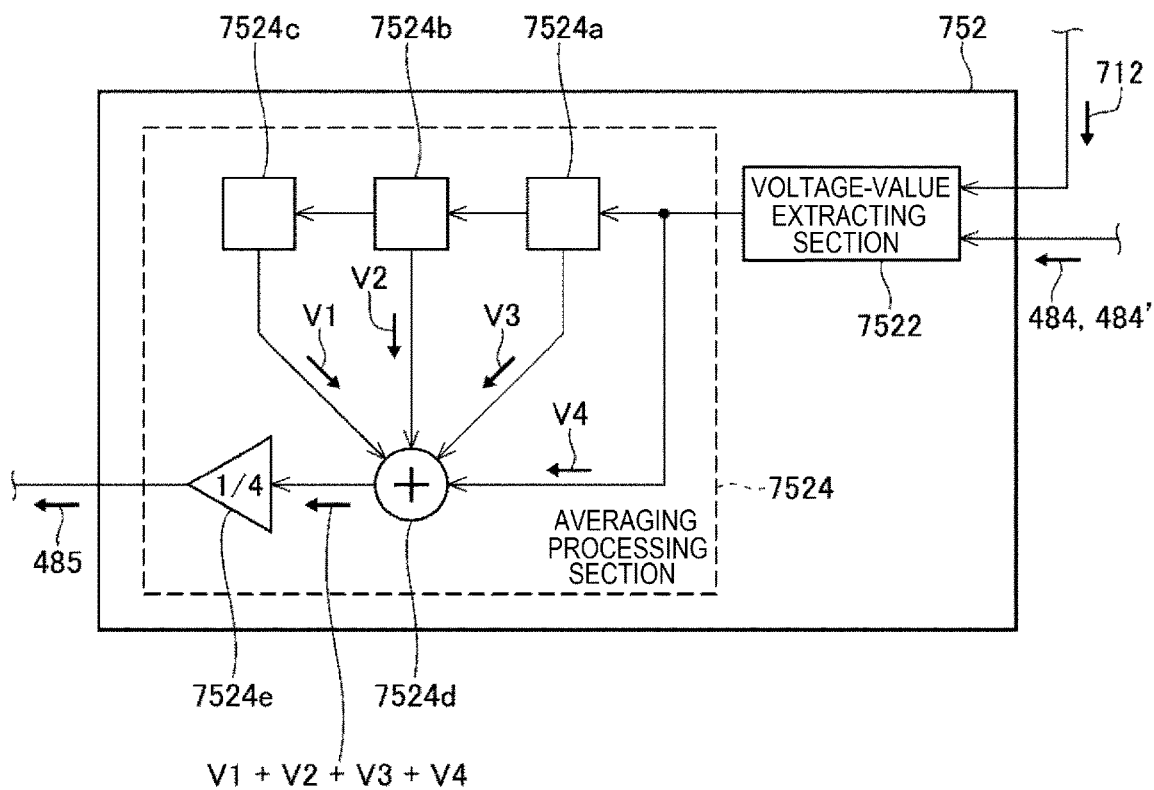
FIG. 18 is a conceptual diagram of a first voltage detecting section shown in FIG. 10.

FIG. 18 is a conceptual diagram of the first voltage detecting section 752 shown in FIG. 10.

The first voltage detecting section 752 shown in FIG. 18 includes a voltage-value extracting section 7522 and an averaging processing section 7524. The voltage-value extracting section 7522 has a function of an A/D converter and samples a voltage value included in the output period voltage amplitude 484 at a fixed sampling interval t shown in FIG. 19.

Figure 19:
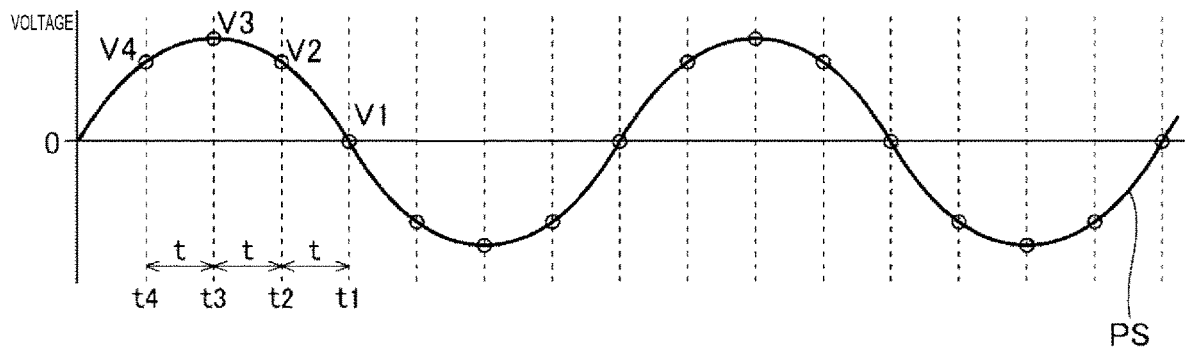
FIG. 19 is a diagram showing an example of a periodic signal.
Figure 20:
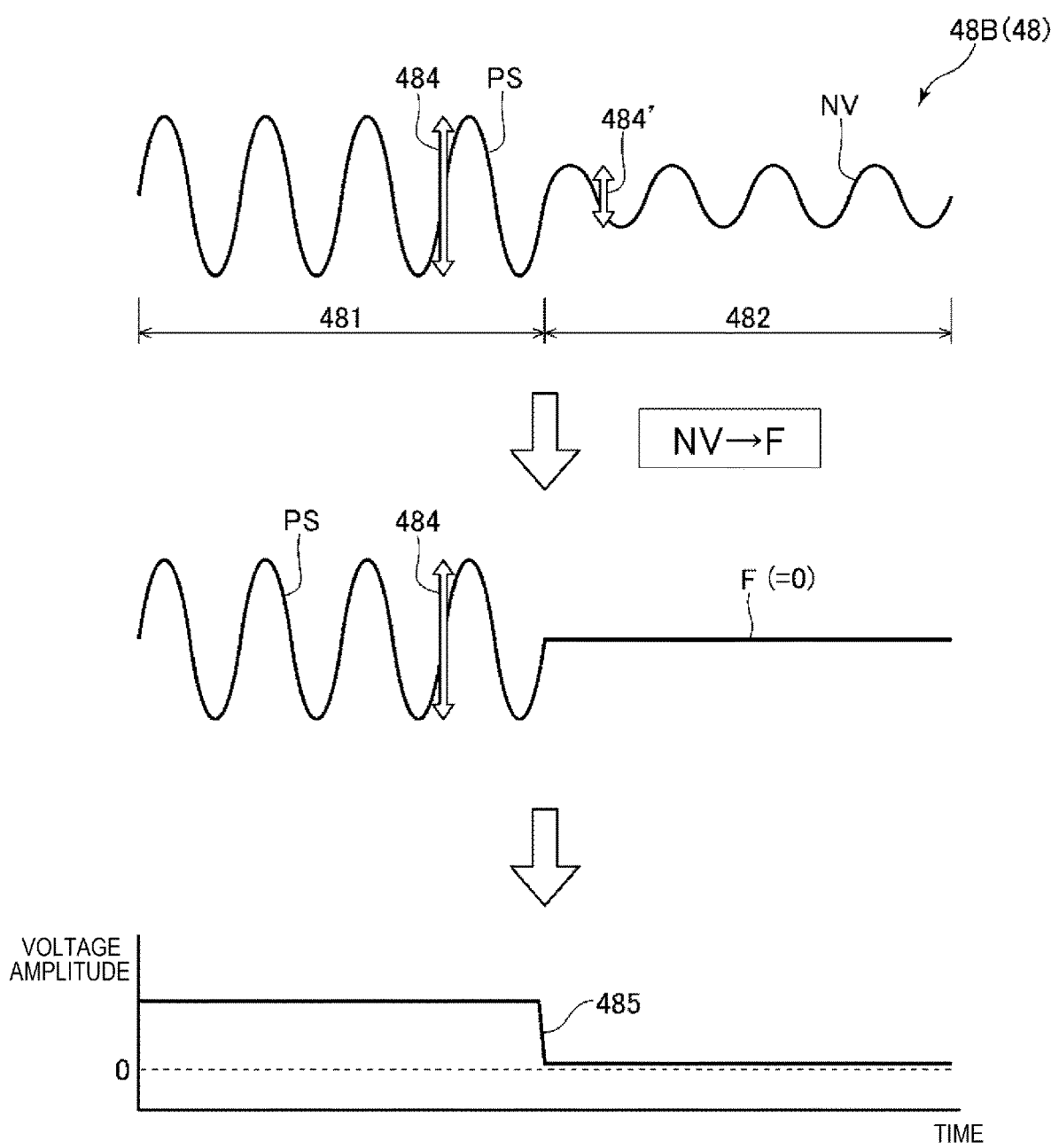
FIG. 20 is a diagram for explaining voltage amplitude detected by the first voltage detecting section and a voltage amplitude detection value output by the first voltage detecting section when an intermittent signal is included in a first driving signal.

FIG. 19 is a diagram showing an example of the periodic signal PS. FIG. 20 is a diagram for explaining the output period voltage amplitude 484 detected by the first voltage detecting section 752 and the voltage amplitude detection value 485 output by the first voltage detecting section 752 when the intermittent signal 48B is included in the first driving signal 48.

As shown in FIG. 19, a sampling interval t, which is a time interval for extracting a voltage value in the voltage-value extracting section 7522, is preferably smaller than one cycle of the periodic signal PS. In other words, the first voltage detecting section 752 of the first driving-signal generating section 66 detects the output period voltage amplitude 484 of the periodic signal PS in the output period 481 shown in FIG. 20. The first voltage detecting section 752 sets the sampling interval t, which is a time interval of the detection that time, shorter than one cycle of the periodic signal PS. Consequently, it is possible to detect, with sufficient accuracy, a voltage value that changes with the periodic signal PS. As a result, it is possible to accurately detect the output period voltage amplitude 484. A magnitude relation between the sampling interval t and one cycle of the periodic signal PS is not particularly limited. As an example, the sampling interval t is preferably 50% or less of one cycle of the periodic signal PS and more preferably 30% or less of one cycle of the periodic signal PS.

The voltage value at each sampling interval t extracted by the voltage-value extracting section 7522 is input to the averaging processing section 7524. When the voltage value is negative, the voltage value is input to the averaging processing section 7524 after the polarity of the voltage value is inverted. Consequently, in the example shown in FIG. 20, the extracted voltage value is averaged by a time and is doubled to calculate the output period voltage amplitude 484.

The averaging processing section 7524 is a so-called moving average filter. The averaging processing section 7524 includes a first delay section 7524*a*, a second delay section 7524*b*, a third delay section 7524*c*, an addition section 7524*d*, and a division section 7524*e*.

For example, in FIG. 19, a voltage value at time t1 is represented as V1, a voltage value at time t2 after the sampling interval t from the time t1 is represented as V2, a voltage value at time t3 after the sampling interval t from the time t2 is represented as V3, and a voltage value at time t4 after the sampling interval t from the time t3 is represented as V4.

The voltage value V1 output from the voltage-value extracting section 7522 at the time t1 is input to the first delay section 7524*a* and the addition section 7524*d*.

The first delay section 7524*a* outputs the voltage value V1, which is output from the voltage-value extracting section 7522, respectively to the second delay section 7524*b* and the addition section 7524*d* at the time t2 delayed by one sampling interval t from the time t1 when the voltage value V1 is input.

The second delay section 7524*b* outputs the voltage value V1, which is input from the first delay section 7524*a*, respectively to the third delay section 7524*c* and the addition section 7524*d* at the time t3 delayed by one sampling interval t from the time t2 when the voltage value V1 is input.

The third delay section 7524*c* outputs the voltage value V1, which is input from the second delay section 7524*b*, to the addition section 7524*d* at the time t4 delayed by one sampling interval t from the time t3 when the voltage value V1 is input.

On the other hand, at the time t4, the voltage value V2 is output from the second delay section 7524*b* to the addition section 7524*d*, the voltage value V3 is output from the first delay section 7524*a* to the addition section 7524*d*, and the voltage value V4 is output from the voltage-value extracting section 7522 to the addition section 7524*d*. FIG. 19 shows a state at the time t4.

Then, at the time t4, the addition section 7524*d* calculates a sum V1+V2+V3+V4 of the voltage values V1, V2, V3, and V4. The calculated sum V1+V2+V3+V4 is output to the division section 7524*e*. A solution (V1+V2+V3+V4)/4 obtained by dividing the sum V1+V2+V3+V4 by four with the division section 7524*e* is the voltage amplitude detection value 485.

So-called low-pass filter processing is applied by applying such averaging processing. As a result, it is possible to feedback the averaged output period voltage amplitude 484 while removing a high-frequency component and suppressing the reflection of an excessively sensitive change.

The configuration of the first voltage detecting section 752 is not limited to the configuration explained above. For example, the averaging processing section 7524 only has to be provided according to necessity or may be omitted. The averaging processing section 7524 may include a correcting section that corrects the voltage values V1 to V4. Specifically, detected errors of the voltage values V1 to V4 may be corrected by providing, for example, a multiplying section that multiplies the voltage values V1 to V4 by any constant.

Feedback of the output period voltage amplitude 484 performed when the intermittent signal 48B is included in the first driving signal 48 is explained.

In order to generate the intermittent signal 48B in the first driving circuit 72, the first pulse signal 91 made intermittent needs to be output from the first PWM-waveform generating section 71. Specifically, the intermittent signal 48B is a signal formed by repetition of the intermittent cycle 483 including the output period 481 and the suspension period 482. In the suspension period 482, since the bending vibration needs to be suspended, both of the first switching element 72*a* and the second switching element 72*b* coupled to the first piezoelectric element 23 and the fifth piezoelectric element 27 are turned off. Consequently, both of the first switching element 72*a* and the second switching element 72*b* change to a high-impedance state. As a result, in the suspension period 482, a state between the first driving circuit 72 and the first and fifth piezoelectric elements 23 and 27 changes to an electrically floating state.

However, the stretching vibration sometimes continues even in this state. Specifically, since the stretching vibration does not affect the driving speed of the rotor 2, control for stabilizing the driving of the rotor 2 is sometimes performed by continuing the stretching vibration even in the suspension period 482.

However, when the vibrating body 17 stretching-vibrates, electric charges involved in a piezoelectric effect are cyclically generated from the first piezoelectric element 23 and the fifth piezoelectric element 27, which are bending piezoelectric elements. Then, as shown in FIG. 20, an unintended voltage change NV involved in this cyclical generation of the electric charges occurs. The voltage change NV is detected by the first voltage detecting section 752 via the wire 751 of the first feedback circuit 75. As a result, even in the suspension period 482 in which the bending vibration is suspended, as shown in FIG. 20, unintended suspension period voltage amplitude 484' detected by the first voltage detecting section 752 is feedbacked to the first driving-voltage control section 68. Then, the detected suspension period voltage amplitude 484' affects the generation of the first target pulse duty ratio signal 87 in the first driving-voltage control section 68 and causes deterioration in accuracy of the driving speed of the rotor 2.

In this embodiment, first, as shown in FIG. 10, the first PWM-waveform generating section 71 inputs a suspension period signal 712 indicating the suspension period 482 to the first voltage detecting section 752. As explained above, in the suspension period 482, the first switching element 72a and the second switching element 72b operating according to the first pulse signal 91 and the first inverted pulse signal 96 are respectively in the high-impedance state. Therefore, the first PWM-waveform generating section 71 outputs, to the first voltage detecting section 752, the suspension period signal 712 indicating a period in which the first switching element 72a and the second switching element 72b are in the high-impedance state.

The first voltage detecting section 752 performs, based on the suspension period signal 712, processing for replacing the detected suspension period voltage amplitude 484' with a proper value. With this processing, it is possible to prevent the unintended suspension period voltage amplitude 484' from being feedbacked.

Specifically, the suspension period voltage amplitude 484' detected in the suspension period 482 indicated by the suspension period signal 712 is regarded as a voltage change unrelated to the first driving signal 48. Therefore, the voltage-value extracting section 7522 replaces the suspension period voltage amplitude 484' input in the suspension period 482 with a predetermined fixed value F as shown in FIG. 20. As a result, the periodic signal PS, a part of a period of which is replaced with the fixed value F, is input to the averaging processing section 7524.

As a result of the averaging by the averaging processing section 7524, as shown in FIG. 20, the voltage amplitude detection value 485 having a value corresponding to the output period voltage amplitude 484 in the output period 481 and having a value corresponding to the fixed value F in the suspension period 482 is generated. In FIG. 20, as an example, the fixed value F is 0.

The voltage amplitude detection value 485 generated as explained above is feedbacked to the first driving-voltage control section 68.

In this way, in this embodiment, the first voltage detecting section 752 of the first driving-signal generating section 66 sets the suspension period voltage amplitude 484' in the suspension period 482 as the fixed value F, subsequently, applies time averaging processing for averaging, with a time, a value obtained by adding up the output period voltage amplitude 484 and the fixed value F, feedbacks the voltage amplitude detection value 485 to the first driving-voltage control section 68 based on a result of the averaging, and generates a target pulse duty ratio.

In such a control, as explained above, the first voltage detecting section 752 does not detect the suspension period voltage amplitude 484' generated independently of the first driving signal 48 in the suspension period 482 and, instead, replaces the suspension period voltage amplitude 484' with the fixed value F. Accordingly, it is possible to eliminate the influence of the suspension period voltage amplitude 484' from the voltage amplitude detection value 485. Consequently, it is possible to generate the voltage amplitude detection value 485 properly reflecting the first driving signal 48 and feedback the voltage amplitude detection value 485. As a result, the first driving-voltage control section 68 calculates a proper deviation between the target driving signal 86 and the voltage amplitude detection value 485. Therefore, it is possible to prevent deterioration in the accuracy of the first driving signal 48 involved in the unintended suspension period voltage amplitude 484'. By changing the fixed value F as appropriate according to necessity, it is also possible to optionally adjust the voltage amplitude detection value 485 generated in the suspension period 482.

The fixed value F may be 0 or may be a value other than 0.

When the first voltage detecting section 752 of the first driving-signal generating section 66 sets the fixed value F to 0, it is possible to eliminate the influence of the suspension period voltage amplitude 484' that should not be originally generated in the suspension period 482.

When the first voltage detecting section 752 of the first driving-signal generating section 66 sets the fixed value F to a value other than 0, it is possible to input some correction value instead of the suspension period voltage amplitude 484' that should not be originally generated in the suspension period 482. Consequently, it is possible to optionally adjust the voltage amplitude detection value 485 generated in the suspension period 482.

The second driving-signal generating section 67 shown in FIG. 10 has the same configuration as the configuration of the first driving-signal generating section 66. Therefore, the second driving-signal generating section 67 is simply explained. The second driving-voltage control section 76 implements PI control based on the target driving signal 86 and the voltage-amplitude detection value 515 output from the second voltage detecting section 832 explained below. The second driving-voltage control section 76 generates a second target pulse duty ratio signal 111 indicating a target pulse duty ratio at which the output period voltage amplitude 514 of the third driving signal 51 reaches a voltage based on the target driving signal 86. In other words, the second driving-voltage control section 76 generates the second target pulse duty ratio signal 111 based on the input target driving signal 86.

The second PWM-waveform generating section 77 generates the second pulse signal 112 having the target pulse duty ratio based on the second target pulse duty ratio signal 111, a frequency of the second pulse signal 112 being a frequency based on the frequency command 88 generated by the frequency control section 62. The second driving circuit 78 generates the third driving signal 51 based on the second pulse signal 112. In other words, the second driving circuit 78 generates the third driving signal 51 using the second pules signal 112 generated based on the second target pulse duty ratio signal 111. The second driving circuit 78 applies the third driving signal 51 to the second piezoelectric element 24 and the fourth piezoelectric element 26.

In the comparing section of the second PWM-waveform generating section 77, as in the comparing section 73 of the first PWM-waveform generating section 71, a bending driving predetermined value for the target pulse duty ratio indicated by the second target pulse duty ratio signal 111 is set. When the target pulse duty ratio indicated by the second target pulse duty ratio signal 111 is smaller than the bending driving predetermined value, the output section of the second PWM-waveform generating section 77 outputs the second pulse signal 112 having a pulse duty ratio fixed to the bending driving predetermined value. In addition, the output section makes the second pulse signal 112 intermittent and outputs the second pulse signal 112. When the second pulse signal 112 made intermittent in this way is input to the second driving circuit 78, the third driving signal 51, which is an intermittently generated periodic signal, is output.

By using the third driving signal 51, which is the intermittent signal, in this way, it is possible to stably drive the second piezoelectric element 24 and the fourth piezoelectric element 26 even at low speed and stably rotate the rotor 2 even in a state in which driving speed is reduced.

The bending driving predetermined value of the target pulse duty ratio set in the comparing section of the second PWM-waveform generating section 77 may be different from the bending driving predetermined value of the target pulse duty ratio set in the comparing section 73 of the first PWM-waveform generating section 71 but is preferably the same. Consequently, the third driving signal 51 is changed from a continuous signal into an intermittent signal at the same timing as the change of the first driving signal 48 explained above or changed from the intermittent signal to the continuous signal. As a result, it is possible to cause the vibrating body 17 to stably bending-vibrate.

The second driving-signal generating section 67 may differentiate the intermittent duty ratio of the third driving signal 51 from the intermittent duty ratio of the first driving signal 48 but preferably sets the intermittent duty ratios the same.

Otherwise, the second PWM-waveform generating section 77 is the same as the first PWM-waveform generating section 71.

The second voltage detecting section 832 has a function of an A/D converter that detects the output period voltage amplitude 514 of the third driving signal 51, in other words, the magnitude of a voltage change that occurs in electrodes of the second piezoelectric element 24 and the fourth piezoelectric element 26. The second voltage detecting section 832 calculates an average of the detected output period voltage amplitude 514 and feedbacks a result of the calculation to the second driving-voltage control section 76 as the voltage amplitude detection value 515.

The second voltage detecting section 832 of the second driving-voltage control section 76 is configured not to detect a suspension period voltage amplitude 514' generated independently of the third driving signal 51 in the suspension period of the third driving signal 51. Accordingly, it is possible to eliminate the influence of the suspension period voltage amplitude 514' from the voltage amplitude detection value 515. Consequently, the second driving-voltage control section 76 calculates a proper deviation between the target driving signal 86 and the voltage amplitude detection value 515. Therefore, it is possible to prevent deterioration in accuracy of the third driving signal 51 involved in the unintended suspension period voltage amplitude 514'.

The second voltage control section 61 includes a PU-voltage control section 114 and a third driving-signal generating section 115. PU indicates Pickup. The third driving-signal generating section 115 generates the second driving signal 50 applied to the third piezoelectric element 25. The third driving-signal generating section 115 includes a third driving-voltage control section 116, a third PWM-waveform generating section 117, and a third driving circuit 118 functioning as a driving circuit. The third PWM-waveform generating section 117 includes a comparing section and an output section not shown in FIG. 10. The third PWM-waveform generating section 117 generates the third pulse signal 125 and makes the third pulse signal 125 intermittent according to necessity. The second driving signal 50 output by the third driving circuit 118 is output to the third piezoelectric element 25. A circuit that outputs output period voltage amplitude 504, which is generated in the third piezoelectric element 25, to the third driving-voltage control section 116 is a third feedback circuit 119. The third feedback circuit 119 includes a wire 1191 that couples the third piezoelectric element 25 and the third driving-voltage control section 116 and a third voltage detecting section 1192.

The third voltage detecting section 1192 detects the output period voltage amplitude 504 generated in the third piezoelectric element 25 and, after performing necessary processing, outputs a result of the processing to the third driving-voltage control section 116. In other words, the third feedback circuit 119 feedbacks the detected output period voltage amplitude 504 to the third driving-voltage control section 116. The third driving-signal generating section 115 includes the third feedback circuit 119 including such a third voltage detecting section 1192.

Further, a circuit that outputs the output period voltage amplitude 504, which is generated in the third piezoelectric element 25, to the frequency control section 62 through a path different from the third feedback circuit 119 is a fourth feedback circuit 120.

The second voltage control section 61 includes a fifth feedback circuit 121 that feedbacks the pickup signal 52, which is output from the sixth piezoelectric element 28 and the seventh piezoelectric element 31, to the PU-voltage control section 114. The second voltage control section 61 controls the second driving signal 50 such that the pickup signal 52 reaches the target value. By maintaining the pickup signal 52 at the target value, the vibrating body 17 stably vibrates along the Y axis. Accordingly, the piezoelectric motor 1 is capable of performing stable driving.

An amplitude command, which is a target amplitude value of the pickup signal 52, and the pickup signal 52 are input to the PU-voltage control section 114 from a not-shown host computer. The PU-voltage control section 114 performs PI control for implementing proportional control for adjusting a proportional gain with respect to a deviation between the amplitude command and the pickup signal 52 and integral control for adjusting an integral gain. The PU-voltage control section 114 generates a voltage command 123 such that the pickup signal 52 reaches amplitude based on the amplitude command.

The third driving-signal generating section 115 has the same configuration as the configuration of the first driving-signal generating section 66 and the second driving-signal generating section 67. Therefore, the third driving-signal generating section 115 is briefly explained.

The third driving-voltage control section 116 implements PI control for performing proportional control for adjusting a proportional gain with respect to a deviation between the voltage command 123 and a voltage amplitude detection value 505 output from the third voltage detecting section 1192 explained below and integral control for adjusting an integral gain. The third driving-voltage control section 116 generates a third target pulse duty ratio signal 124 indicating a target pulse duty ratio at which the output period voltage amplitude 504 of the second driving signal 50 reaches a voltage based on the voltage command 123. The third driving-voltage control section 116 transmits the third target pulse duty ratio signal 124 to the third PWM-waveform generating section 117.

The third PWM-waveform generating section 117 has a target pulse duty ratio based on the third target pulse duty ratio signal 124 and generates the third pulse signal 125, a frequency of which is a frequency based on the frequency command 88 generated by the frequency control section 62. The third driving circuit 118 generates the second driving signal 50 based on the third pulse signal 125. The third driving circuit 118 applies the second driving signal 50 to the third piezoelectric element 25.

In the comparing section of the third PWM-waveform generating section 117, as in the comparing section 73 of the first PWM-waveform generating section 71, a stretching driving predetermined value is set as a predetermined value for the target pulse duty ratio indicated by the third target pulse duty ratio signal 124. When the target pulse duty ratio indicated by the third target pulse duty ratio signal 124 is smaller than the stretching driving predetermined value, the output section of the third PWM-waveform generating section 117 outputs the third pulse signal 125 having a pulse duty ratio fixed to the stretching driving predetermined value. In addition, the output section makes the third pulse signal 125 intermittent and outputs the third pulse signal 125. When the third pulse signal 125 made intermittent in this way is input to the third driving circuit 118, the second driving signal 50, which is an intermittently generated periodic signal, is output.

By using the second driving signal 50, which is an intermittent signal, in this way, it is possible to stably drive the third piezoelectric element 25 even at low speed and stably rotate the rotor 2 even in a state in which driving speed is reduced.

The stretching driving predetermined value of the target pulse duty ratio set in the comparing section of the third PWM-waveform generating section 117 may be the same as the bending driving predetermined value set in the comparing section 73 of the first PWM-waveform generating section 71 and the comparing section of the second PWM-waveform generating section 77. However, it is preferable to differentiate the stretching driving predetermined value and the bending driving predetermined value.

Specifically, the vibrating body 17 includes the projection 22 in contact with the rotor 2, which is the section to be driven, as explained above. The first piezoelectric element 23 to the fifth piezoelectric element 27 functioning as piezoelectric elements for driving include the third piezoelectric element 25 functioning as a stretching piezoelectric element that causes the vibrating body 17 to stretching-vibrate, and the first piezoelectric element 23, the second piezoelectric element 24, the fourth piezoelectric element 26, and the fifth piezoelectric element 27 functioning as bending piezoelectric elements that cause the vibrating body 17 to bending-vibrate. The second driving signal 50, which is a stretching driving signal, is applied to the third piezoelectric element 25. The first driving signal 48, which is a bending driving signal, is applied to the first piezoelectric element 23 and the fifth piezoelectric element 27. The third driving signal 51, which is a bending driving signal, is applied to the second piezoelectric element 24 and the fourth piezoelectric element 26.

At this time, the third driving-signal generating section 115 may set an intermittent duty ratio of the second driving signal 50 and intermittent duty ratios of the first driving signal 48 and the third driving signal 51 the same but preferably differentiates the intermittent duty ratios. Since vibration characteristics are different in the stretching driving and the bending driving, it is possible to further optimize the vibration of the vibrating body 17 by differentiating the stretching driving predetermined value and the bending driving predetermined value.

Specifically, when a target pulse duty ratio used for generation of the second driving signal 50, which is the stretching driving signal, is set as a stretching driving target pulse duty ratio and a target pulse duty ratio used for generation of the first driving signal 48 and the third driving signal 51, which are the bending driving signals, is set as a bending driving target pulse duty ratio, the first driving-signal generating section 66 and the second driving-signal generating section 67 preferably set a bending driving predetermined value, which is a predetermined value for the bending driving target pulse duty ratio, larger than a stretching driving predetermined value, which is a predetermined value for the stretching driving target pulse duty ratio. The stretching driving has a wide range of a target pulse duty ratio for enabling stable driving compared with the bending driving. Accordingly, by setting the bending driving predetermined value larger than the stretching driving predetermined value, the stretching driving can be continuously performed in the wider range of the target pulse duty ratio compared with the bending driving. Consequently, it is easy to maintain stable stretching driving.

Further, the third driving-signal generating section 115 preferably sets the stretching driving predetermined value to 0. In other words, the third driving-signal generating section 115 preferably does not make the second driving signal 50, which is the stretching driving signal, intermittent. For the stretching driving signal, unlike the bending driving signal, the target pulse duty ratio does not need to be set to a value as small as 0% even when the rotor 2 is driven at low speed. Accordingly, it is possible to avoid intermittent driving with low necessity and stably drive the rotor 2.

The third voltage detecting section 1192 has a function of an A/D converter that detects the output period voltage amplitude 504 of the second driving signal 50, in other words, the magnitude of a voltage change that occurs in an electrode of the third piezoelectric element 25. The third voltage detecting section 1192 calculates an average of the detected output period voltage amplitude 504 and feedbacks a result of the calculation to the third driving-voltage control section 116 as the voltage amplitude detection value 505.

The third voltage detecting section 1192 of the third driving-signal generating section 115 is configured not to detect unintended suspension period voltage amplitude 504' generated independently of the second driving signal 50 in a suspension period of the second driving signal 50. Accordingly, it is possible to eliminate the influence of the suspension period voltage amplitude 504' from the voltage amplitude detection value 505. Consequently, the third driving-voltage control section 116 calculates a proper deviation between the voltage command 123 and the voltage amplitude detection value 505. Therefore, it is possible to prevent deterioration in accuracy of the second driving signal involved in the unintended suspension period voltage amplitude 504'.

Otherwise, the configuration of the third PWM-waveform generating section 117 is the same as the configuration of the first PWM-waveform generating section 71 and the configuration of the second PWM-waveform generating section 77.

The setting of the bending driving predetermined value and the stretching driving predetermined value explained above only have to be performed according to necessity or may be omitted. In that case, for example, the first driving signal and the third driving signal 51 may be always the intermittent signal 48B. However, from the viewpoint of performing more stable driving, it is preferable to set the predetermined value explained above as a threshold and control the continuous signal 48A and the intermittent signal 48B to be switched.

The second driving signal 50 and the pickup signal 52 generated by the third driving circuit 118 are input to the frequency control section 62. The frequency control section 62 calculates a phase difference between the second driving signal 50 and the pickup signal 52 and performs PI control for implementing proportional control for adjusting a proportional gain with respect to a deviation between a preset target phase difference and an actual phase difference and integral control for adjusting an integral gain with respect to the deviation. The frequency control section 62 generates the frequency command 88 such that the actual phase difference reaches a phase difference based on the target phase difference. The frequency command 88 generated by the frequency control section 62 is transmitted to the first PWM-waveform generating section 71, the second PWM-waveform generating section 77, and the third PWM-waveform generating section 117. The first PWM-waveform generating section 71, the second PWM-waveform generating section 77, and the third PWM-waveform generating section 117 respectively generate the first pulse signal 91, the second pulse signal 112, and the third pulse signal 125 having frequencies based on the frequency command 88. The first pulse signal 91, the second pulse signal 112, and the third pulse signal 125 are respectively input to the first driving circuit 72, the second driving circuit 78, and the third driving circuit 118. As explained above, the third driving circuit 118 generates the second driving signal 50 for causing the vibrating body 17 to perform the stretching vibration. The first driving circuit 72 and the second driving circuit 78 generate the first driving signal 48 and the third driving signal 51 for causing the vibrating body 17 to bending-vibrate.

The vibrating body 17 combines the stretching vibration and the bending vibration and moves the rotor 2. The third driving circuit 118 generates the second driving signal 50 for causing the vibrating body 17 to stretching-vibrate. The first driving circuit 72 and the second driving circuit 78 generate the first driving signal 48 and the third driving signal 51 for causing the vibrating body 17 to bending-vibrate.

As explained above, the piezoelectric motor 1, which is the piezoelectric driving device according to this embodiment, includes the vibrating body 17 that vibrates when the first driving signal 48 including the periodic signal PS is applied to the first piezoelectric element 23 and the fifth piezoelectric element 27, which are the piezoelectric elements for driving, the rotor 2, which is the section to be driven that is driven by the vibration of the vibrating body 17, and the first driving-signal generating section 66 that generates the first driving signal 48 using the first pulse signal 91 generated based on the target pulse duty ratio, detects the output period voltage amplitude 484 generated in the first piezoelectric element 23 and the fifth piezoelectric element 27, and generates the target pulse duty ratio based on the output period voltage amplitude 484. The first driving signal 48 includes the intermittent signal 48B formed by the output period 481 in which the periodic signal PS is output and the suspension period 482 in which the output of the periodic signal PS is suspended. The first driving-signal generating section 66 does not detect the suspension period voltage amplitude 484' generated in the first piezoelectric element 23 and the fifth piezoelectric element 27 in the suspension period 482 and detects the output period voltage amplitude 484 generated in the first piezoelectric element 23 and the fifth piezoelectric element 27 in the output period 481.

With such a piezoelectric motor 1, since the first driving signal 48 includes the intermittent signal 48B, it is possible to reduce the apparent amplitude of the first driving signal 48. Consequently, it is possible to stably drive the first piezoelectric element 23 and the fifth piezoelectric element 27 even at low speed and stably drive the rotor 2 even when driving speed is low. The first driving-signal generating section 66 is configured not to detect the suspension period voltage amplitude 484' generated independently of the first driving signal 48 in the suspension period 482. Therefore, it is possible to generate and feedback the voltage amplitude detection value 485 properly reflecting the first driving signal 48 including the intermittent signal 48B. As a result, it is possible to reflect only the output period voltage amplitude 484 on the target pulse duty ratio. It is possible to prevent deterioration in accuracy of the first driving signal 48 involved in the feedback. Consequently, even when the first driving signal 48 including the intermittent signal 48B is used, it is possible to accurately drive the first piezoelectric element 23 and the fifth piezoelectric element 27 and stably drive the rotor 2.

A control method for the piezoelectric motor 1 is explained with reference to FIG. 21.

All of control methods for the first voltage detecting section 752, the second voltage detecting section 832, and the third voltage detecting section 1192 are substantially the same. In the following explanation, the control method for the first voltage detecting section 752 is explained. Explanation of the control methods for the second voltage detecting section 832 and the third voltage detecting section 1192 is omitted.

Figure 21:
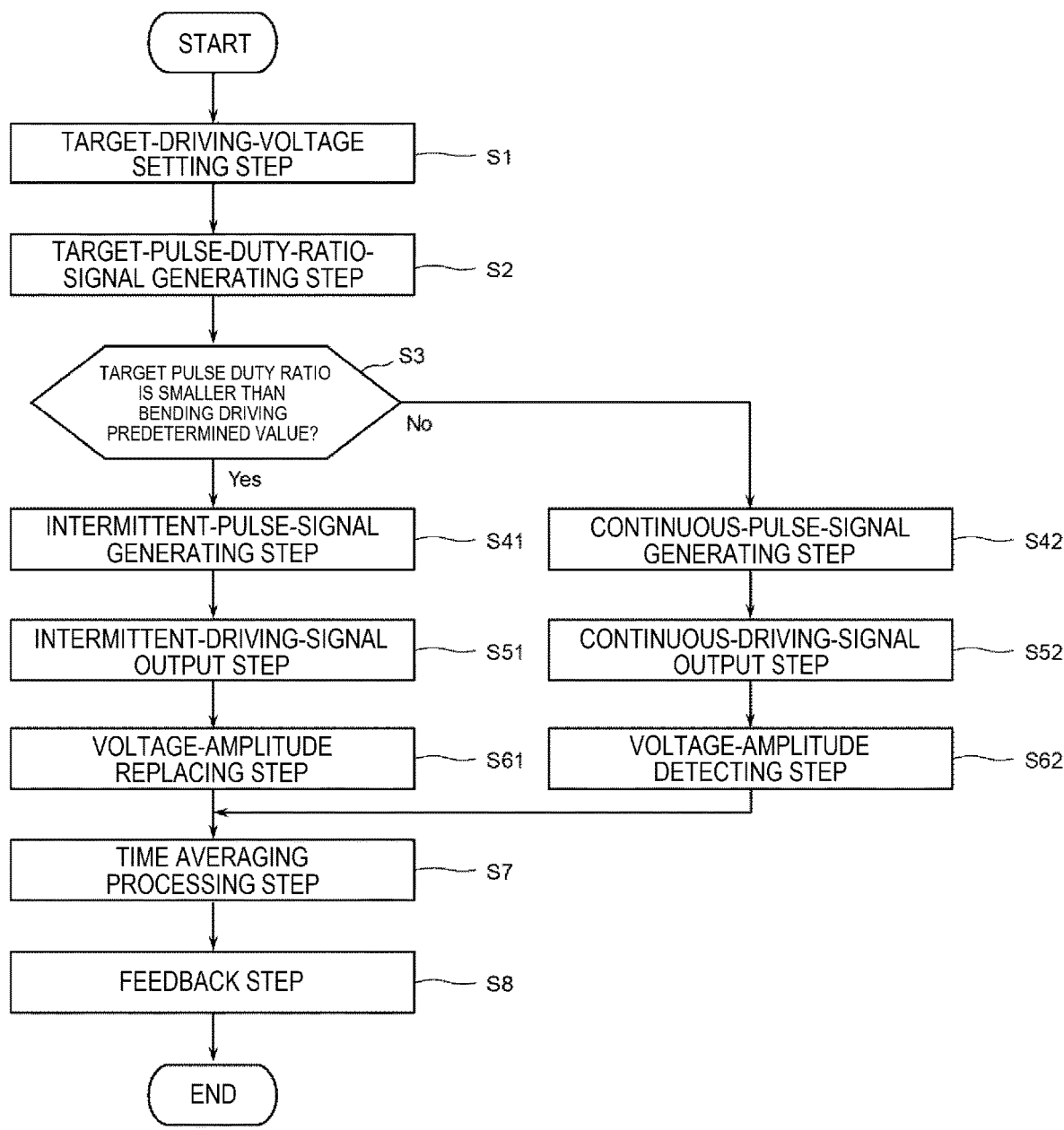
FIG. 21 is a flowchart for explaining a control method for the piezoelectric driving device according to the first embodiment.

FIG. 21 is a flowchart for explaining a control method for the piezoelectric driving device according to the embodiment. In this explanation, as an example, the first driving signal 48 is a signal alternately switched to the continuous signal 48A and the intermittent signal 48B with the bending driving predetermined value set as the threshold.

The control method for the piezoelectric driving device shown in FIG. 21 includes a target-driving-voltage setting step of setting a target driving voltage with the speed control section 65, a target-pulse-duty-ratio-signal generating step of generating, with the first driving-voltage control section 68, the first target pulse duty ratio signal indicating the target pulse duty ratio, a target-pulse-duty-ratio comparing step of comparing the target pulse duty ratio and the bending driving predetermined value, an intermittent-pulse-signal generating step and a continuous-pulse-signal generating step of generating the first pulse signal 91 based on the target pulse duty ratio and a result of the comparison, an intermittent-driving-signal output step and a continuous-driving-signal output step of generating, based on the first pulse signal 91, the first driving signal 48 including the continuous signal 48A or the intermittent signal 48B and outputting the first driving signal 48, a voltage-amplitude replacing step of replacing, when the intermittent signal 48B is generated, the suspension period voltage amplitude 484' with the fixed value F in the suspension period 482, a voltage-amplitude detecting step of detecting the output period voltage amplitude 484 when the continuous signal 48A is generated, a time averaging processing step of applying time averaging processing to a signal including the output period voltage amplitude 484 and the fixed value F and obtaining the voltage amplitude detection value 485, and a feedback step of feedbacking the voltage amplitude detection value 485.

Step S1 in FIG. 21 is the target-driving-voltage setting step. In this step, the speed control section 65 generates a target driving voltage corresponding to the target driving speed of the rotor 2, further generates the target driving signal 86 corresponding to the target driving voltage, and outputs the target driving signal 86 to the first driving-voltage control section 68.

Step S2 in FIG. 21 is the target-pulse-duty-ratio-signal generating step. In this step, the first driving-voltage control section 68 calculates a target pulse duty ratio based on the target driving voltage indicated by the target driving signal 86. The first driving-voltage control section 68 generates the first target pulse duty ratio signal 87 indicating the target pulse duty ratio. The first driving-voltage control section 68 outputs the generated first target pulse duty ratio signal 87 to the first PWM-waveform generating section 71.

Step S3 in FIG. 21 is the target-pulse-duty-ratio comparing step. In this step, the comparing section 73 compares the target pulse duty ratio indicated by the first target pulse duty ratio signal 87 and a bending driving predetermined value serving as a threshold for determining whether intermittent driving is performed. Specifically, the comparing section 73 determines whether the target pulse duty ratio is smaller than the bending driving predetermined value. When the target pulse duty ratio is equal to or larger than the bending driving predetermined value, the comparing section 73 does not make the first pulse signal 91 output from the output section 74 intermittent. On the other hand, when the target pulse duty ratio is smaller than the bending driving predetermined value, the comparing section 73 makes the first pulse signal 91 output from the output section 74 intermittent. The comparing section 73 outputs a comparison result signal 89 including a result of the comparison to the output section 74.

Step S41 in FIG. 21 is the intermittent-pulse-signal generating step. When the target pulse duty ratio is smaller than the bending driving predetermined value in the comparing section 73, the output section 74 generates the first pulse signal 91 based on the first target pulse duty ratio signal 87. The output section 74 sets an intermittent duty ratio of the first pulse signal 91 based on the comparison result signal 89. Consequently, the output section 74 generates the first pulse signal 91 having a waveform made intermittent at the intermittent duty ratio.

When the first pulse signal 91 is made intermittent, first, the intermittent duty ratio of the first pulse signal 91 is set based on a relation between the target pulse duty ratio and the intermittent duty ratio. The intermittent duty ratio of the first driving signal 48 is adjusted based on the intermittent duty ratio.

Step S51 in FIG. 21 is the intermittent-driving-signal output step. When the output section 74 generates and outputs the first pulse signal 91 having the waveform made intermittent, the first driving circuit 72 generates the first driving signal 48 having the waveform made intermittent. The first driving circuit 72 outputs the first driving signal 48 to the first piezoelectric element 23 and the fifth piezoelectric element 27.

Step S61 in FIG. 21 is the voltage-amplitude replacing step. When the first driving signal 48 includes the intermittent signal 48B, the voltage-value extracting section 7522 does not detect the suspension period voltage amplitude 484' generated in the first piezoelectric element 23 and the fifth piezoelectric element 27 in the suspension period 482 of the intermittent signal 48B and, instead, regards the fixed value F as a detection value. In other words, the voltage-value extracting section 7522 replaces the suspension period voltage amplitude 484' with the fixed value F.

Step S42 in FIG. 21 is the continuous-pulse-signal generating step. When the target pulse duty ratio is equal to or larger than the bending driving predetermined value in the comparing section 73, the output section 74 generates the first pulse signal 91 based on the first target pulse duty ratio signal 87. The output section 74 sets the first pulse signal 91 as a continuous signal based on the comparison result signal 89. Consequently, the output section 74 generates the first pulse signal 91 having a continuous waveform.

Step S52 in FIG. 21 is the continuous-driving-signal output step. When the output section 74 generates and outputs the first pulse signal 91 having the continuous waveform, the first driving circuit 72 generates the first driving signal 48 having a continuous waveform. The first driving circuit outputs the first driving signal 48 to the first piezoelectric element 23 and the fifth piezoelectric element 27.

Step S62 in FIG. 21 is the voltage-amplitude detecting step. When the first driving signal 48 is the continuous signal 48A, the voltage-value extracting section 7522 detects the output period voltage amplitude 484 generated in the first piezoelectric element 23 and the fifth piezoelectric element 27.

Step S7 in FIG. 21 is the time averaging processing step. The averaging processing section 7524 applies time averaging processing to the signal including the fixed value F replaced in step S61 or the suspension period voltage amplitude 484 detected in step S62. Consequently, the voltage amplitude detection value 485 is generated.

Step S8 in FIG. 21 is the feedback step. The voltage amplitude detection value 485 generated in step S7 is feedbacked to the first driving-voltage control section 68. The first driving-voltage control section 68 generates the first target pulse duty ratio signal 87 based on the target driving signal 86 and the voltage amplitude detection value 485.

As explained above, the control method for the piezoelectric motor 1, which is the piezoelectric driving device according to this embodiment, is the control method for the piezoelectric motor 1 including the vibrating body 17 that vibrates when the first driving signal 48 including the periodic signal PS is applied to the first piezoelectric element 23 and the fifth piezoelectric element 27, which are the piezoelectric elements for driving, the rotor 2, which is the section to be driven that is driven by the vibration of the vibrating body 17, and the first driving-signal generating section 66 that generates the first driving signal 48 using the first pulse signal 91 generated based on the target pulse duty ratio, the first driving-signal generating section 66 detecting the output period voltage amplitude 484 generated in the first piezoelectric element 23 and the fifth piezoelectric element 27 and generating a target pulse duty ratio based on the output period voltage amplitude 484. The first driving signal 48 includes the intermittent signal 48B formed by the output period 481 in which the periodic signal PS is output and the suspension period 482 in which the output of the periodic signal PS is suspended. The first driving-signal generating section 66 detects the output period voltage amplitude 484 generated in the first piezoelectric element 23 and the fifth piezoelectric element 27 in the output period 481 and does not detect the suspension period voltage amplitude 484' generated in the first piezoelectric element 23 and the fifth piezoelectric element 27 in the suspension period 482.

With such a control method, since the first driving signal 48 includes the intermittent signal 48B, it is possible to reduce the apparent amplitude of the first driving signal 48. Consequently, it is possible to stably drive the first piezoelectric element 23 and the fifth piezoelectric element 27 even at low speed and stably drive the rotor 2 even when driving speed is low. The first driving-signal generating section 66 does not detect the suspension period voltage amplitude 484' generated independently of the first driving signal 48 in the suspension period 482. Therefore, it is possible to generate and feedback the voltage amplitude detection value 485 properly reflecting the first driving signal 48. As a result, it is possible to prevent deterioration in accuracy of the first driving signal 48 involved in the feedback. Consequently, even when the first driving signal 48 including the intermittent signal 48B is used, it is possible to accurately drive the first piezoelectric element 23 and the fifth piezoelectric element 27 and stably drive the rotor 2.

In this specification, not detecting the suspension period voltage amplitude 484' indicates that the suspension period voltage amplitude 484' is replaced with the fixed value F or the suspension period voltage amplitude 484' is reduced to a degree not causing a problem in the generation of the target pulse duty ratio.

As explained above, the first piezoelectric element 23 to the fifth piezoelectric element 27, which are the piezoelectric elements for driving, include the third piezoelectric element 25, which is the stretching piezoelectric element that causes the vibrating body 17 to stretching-vibrate, and the first piezoelectric element 23, the second piezoelectric element 24, the fourth piezoelectric element 26, and the fifth piezoelectric element 27, which are the bending piezoelectric elements that cause the vibrating body 17 to bending-vibrate. Further, the output period voltage amplitude 504, which is the stretching voltage amplitude, is generated in the third piezoelectric element 25. The output period voltage amplitudes 484 and 514, which are the bending voltage amplitudes, are generated in the first piezoelectric element 23, the second piezoelectric element 24, the fourth piezoelectric element 26, and the fifth piezoelectric element 27.

The first driving-signal generating section 66 does not detect the suspension period voltage amplitude 484' generated in the first piezoelectric element 23 and the fifth piezoelectric element 27 in the suspension period 482 of the intermittent signal 48B. Similarly, the second driving-signal generating section 67 does not detect the suspension period voltage amplitude 514' generated in the second piezoelectric element 24 and the fourth piezoelectric element 26 in the suspension period of the intermittent signal.

With such control, in particular, it is possible to prevent the suspension period voltage amplitude 484' and 514' from affecting the generation of the first driving signal 48 and the third driving signal 51 that affect the driving speed of the rotor 2.

On the other hand, the third driving-signal generating section 115 does not detect the suspension period voltage amplitude 504' generated in the third piezoelectric element 25 in the suspension period of the intermittent signal.

With such control, in particular, it is possible to detect and feedback the voltage amplitude detection value 505 relatively sufficiently reflecting the target pulse duty ratio indicated by the third target pulse duty ratio signal 124.

2. Second Embodiment

A robot including a piezoelectric motor according to a second embodiment is explained.

Figure 22:
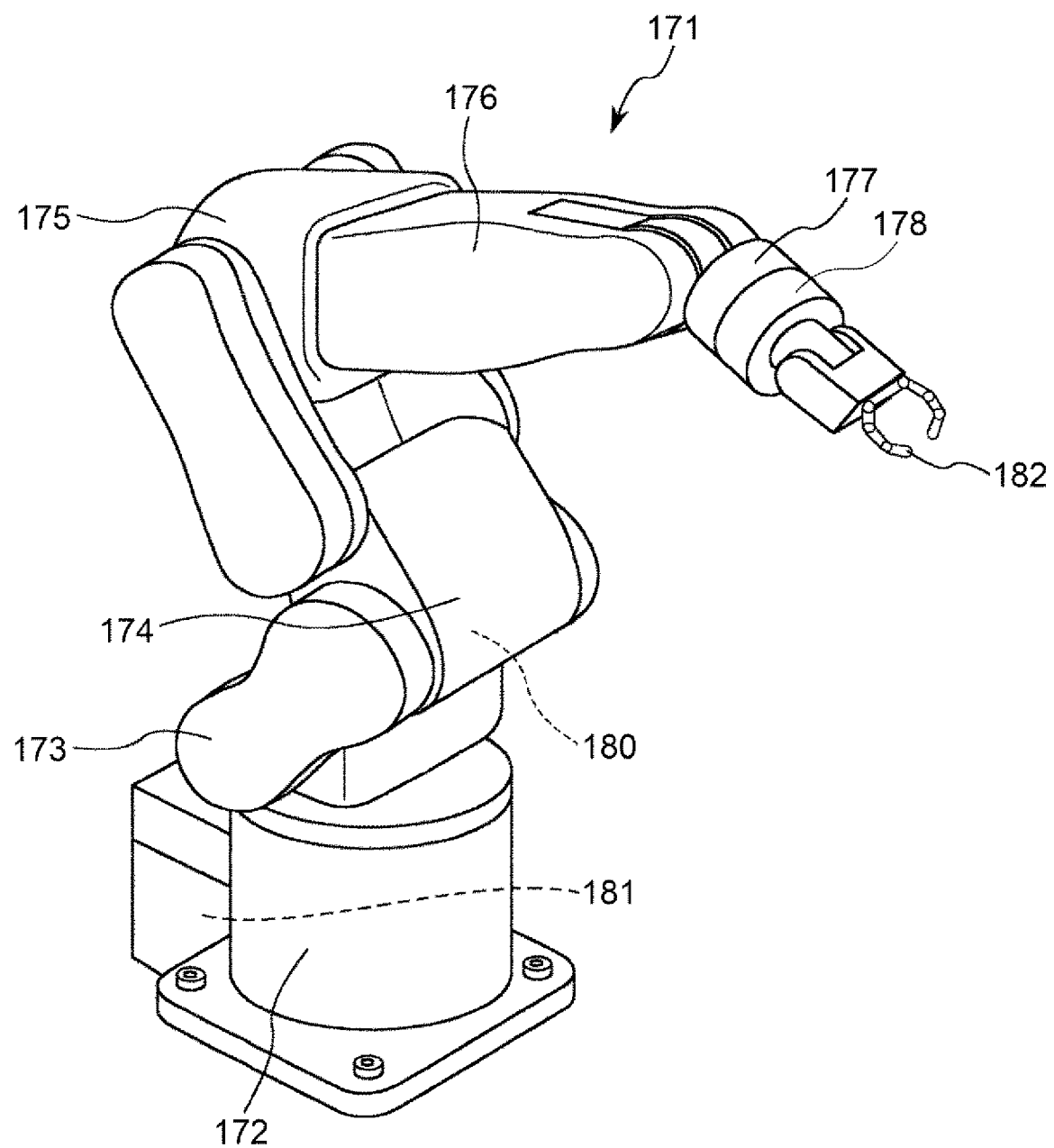
FIG. 22 is a schematic perspective view showing the configuration of a robot including a piezoelectric motor.

FIG. 22 is a schematic perspective view showing the configuration of the robot including the piezoelectric motor. A robot 171 shown in FIG. 22 can perform work such as supply, removal, conveyance, assembly, and the like of a precision instrument and components configuring the precision instrument. The robot 171 is a six-axis robot and includes a base 172 fixed to a floor or a ceiling, a first arm 173 turnably coupled to the base 172, a second arm 174 turnably coupled to the first arm 173, and a third arm 175 turnably coupled to the second arm 174. Further, the robot 171 includes a fourth arm 176 turnably coupled to the third arm 175, a fifth arm 177 turnably coupled to the fourth arm 176, a sixth arm 178 turnably coupled to the fifth arm 177, and a control device 181 that controls driving of the first arm 173 to the sixth arm 178.

A hand coupling section is provided in the sixth arm 178. An end effector 182 corresponding to work to be executed by the robot 171 is attached to the hand coupling section. Piezoelectric motors 180 functioning as piezoelectric driving devices are mounted on all or a part of joint sections. The first arm 173 to the sixth arm 178 are turned by driving of the piezoelectric motors 180. The piezoelectric motor 180 may be mounted on the end effector 182 and used for driving of the end effector 182. The piezoelectric motor 1 explained above is used in the piezoelectric motors 180.

The control device 181 is configured by a computer and includes, for example, a CPU (Central Processing Unit), a memory, and an interface. A processor executes predetermined programs stored in the memory to control driving of the sections of the robot 171. The programs may be downloaded from an external server via an interface. All or a part of the components of the control device 181 may be provided on the outside of the robot 171 and coupled via a communication network such as a local area network.

In this way, the robot 171 includes at least the first arm 173, the second arm 174 coupled to the first arm 173 in the joint section, and the piezoelectric motor 1 disposed in the joint section.

Specifically, the robot 171 includes the piezoelectric motor 1 including the vibrating body 17 that vibrates when the first driving signal 48 including the periodic signal PS is applied to the first piezoelectric element 23 and the fifth piezoelectric element 27, which are the piezoelectric elements for driving, the rotor 2, which is the section to be driven that is driven by the vibration of the vibrating body 17, and the first driving-signal generating section 66 that generates the first driving signal 48 using the first pulse signal 91 generated based on the target pulse duty ratio, detects the output period voltage amplitude 484 generated in the first piezoelectric element 23 and the fifth piezoelectric element 27, and reflects the output period voltage amplitude 484 on the target pulse duty ratio. The first driving signal 48 includes the intermittent signal 48B formed by the output period 481 in which the periodic signal PS is output and the suspension period 482 in which the output of the periodic signal PS is suspended. The first driving-signal generating section 66 does not detect the suspension period voltage amplitude 484' generated in the first piezoelectric element 23 and the fifth piezoelectric element 27 in the suspension period 482 and detects the output period voltage amplitude 484 generated in the first piezoelectric element 23 and the fifth piezoelectric element 27 in the output period 481.

Such a robot 171 includes the piezoelectric motor 1 capable of being stably driven even at low speed. Therefore, the robot 171 has an excellent driving characteristic.

3. Third Embodiment

A printer including a piezoelectric motor according to a third embodiment is explained.

Figure 23:
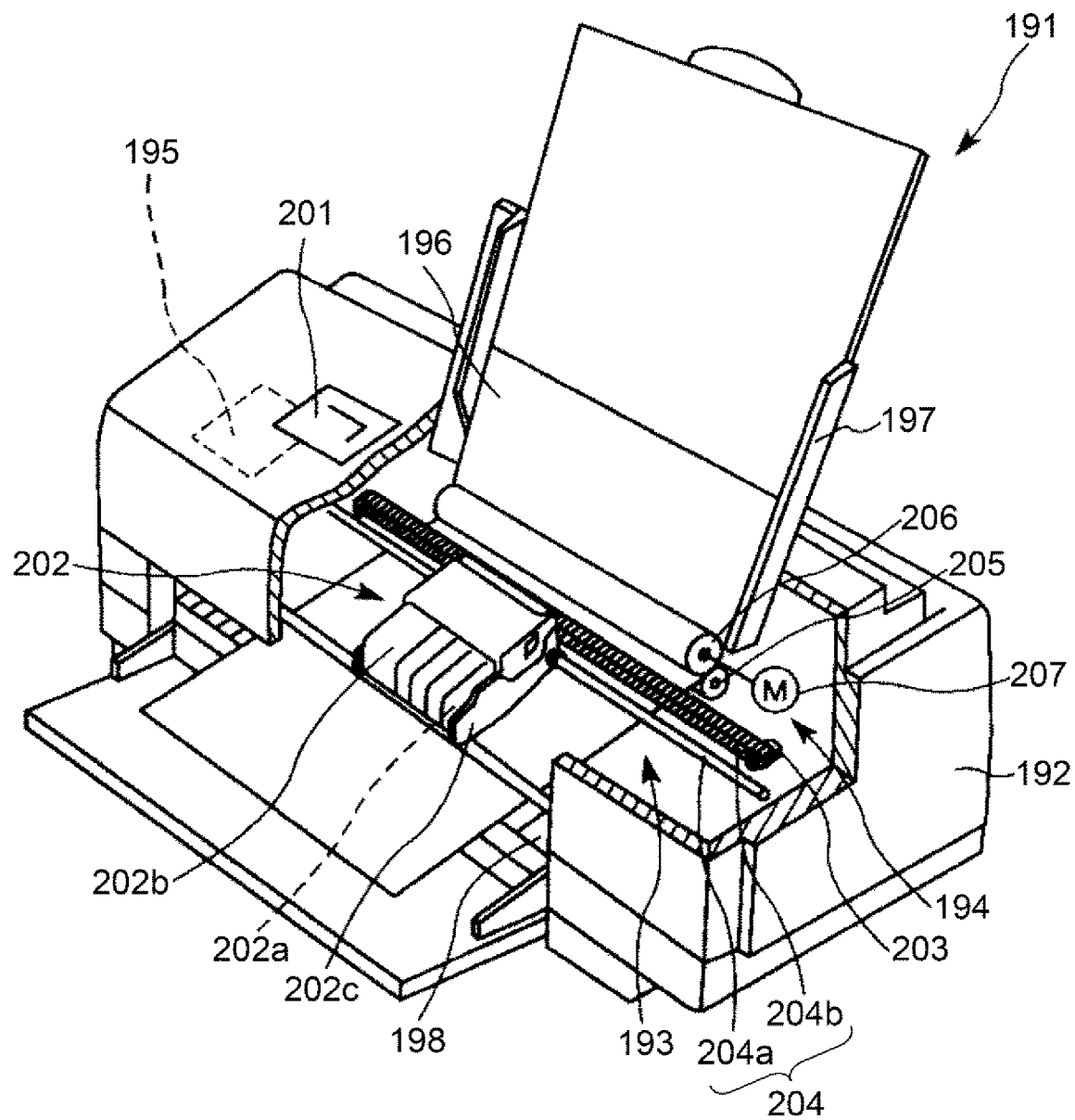
FIG. 23 is a schematic perspective view showing the configuration of a printer including the piezoelectric motor.

FIG. 23 is a schematic perspective view showing the configuration of the printer including the piezoelectric motor.

A printer 191 shown in FIG. 23 includes an apparatus body 192 and a printing mechanism 193, a paper feeding mechanism 194, and a control device 195 provided on the inside of the apparatus body 192. A tray 197 in which recording paper 196 is set, a paper discharge port 198 for discharging the recording paper 196, and an operation panel 201 such as a liquid crystal display are provided in the apparatus body 192.

The printing mechanism 193 includes a head unit 202, a carriage motor 203, and a reciprocating mechanism 204 that causes the head unit 202 to reciprocate with a driving force of the carriage motor 203. The head unit 202 includes a head 202a, which is an inkjet recording head, an ink cartridge 202b that supplies ink to the head 202a, and a carriage 202c mounted with the head 202a and the ink cartridge 202b.

The reciprocating mechanism 204 includes a carriage guide shaft 204a that supports the carriage 202c to be capable of reciprocating and a timing belt 204b that moves the carriage 202c on the carriage guide shaft 204a with a driving force of the carriage motor 203. The paper feeding mechanism 194 includes a driven roller 205 and a driving roller 206 that are in press-contact with each other and a piezoelectric motor 207 functioning as a piezoelectric driving device that drives the driving roller 206. The piezoelectric motor 1 explained above is used as the piezoelectric motor 207.

In such a printer 191, the paper feeding mechanism 194 intermittently feeds the recording paper 196 to the vicinity of the lower part of the head unit 202 one by one. At this time, the head unit 202 reciprocates in a direction substantially orthogonal to a feeding direction of the recording paper 196 and printing on the recording paper 196 is performed.

The control device 195 is configured by a computer and includes, for example, a CPU, a memory, and an interface. A processor executes predetermined programs stored in the memory to control driving of the sections of the printer 191. Such a control is executed based on, for example, printing data input from a host computer such as a personal computer via the interface. The programs may be downloaded from an external server via the interface. All or a part of the components of the control device 195 may be provided on the outside of the printer 191 and coupled via a communication network such as local area network.

In this way, the printer 191 includes the piezoelectric motor 1.

Specifically, the printer 191 includes the piezoelectric motor 1 including the vibrating body 17 that vibrates when the first driving signal 48 including the periodic signal PS is applied to the first piezoelectric element 23 and the fifth piezoelectric element 27, which are the piezoelectric elements for driving, the rotor 2, which is the section to be driven that is driven by the vibration of the vibrating body 17, and the first driving-signal generating section 66 that generates the first driving signal 48 using the first pulse signal 91 generated based on the target pulse duty ratio, detects the output period voltage amplitude 484 generated in the first piezoelectric element 23 and the fifth piezoelectric element 27, and reflects the output period voltage amplitude 484 on the target pulse duty ratio. The first driving signal 48 includes the intermittent signal 48B formed by the output period 481 in which the periodic signal PS is output and the suspension period 482 in which the output of the periodic signal PS is suspended. The first driving-signal generating section 66 does not detect the suspension period voltage amplitude 484' generated in the first piezoelectric element 23 and the fifth piezoelectric element 27 in the suspension period 482 and detects the output period voltage amplitude 484 generated in the first piezoelectric element 23 and the fifth piezoelectric element 27 in the output period 481.

Such a printer 191 includes the piezoelectric motor 1 capable of being stably driven even at low speed. Therefore, the printer 191 has an excellent driving characteristic.

In this embodiment, the piezoelectric motor 207 drives the driving roller 206 for paper feeding. Besides, for example, the piezoelectric motor 207 may drive the carriage 202c.

The control method for the piezoelectric driving device, the piezoelectric driving device, and the robot according to the embodiments of the present disclosure are explained above. However, the present disclosure is not limited to this. The components of the sections in the embodiment can be replaced with any components having the same functions. In the embodiments, any other components may be added. Further, a step for any purpose may be added to the control method for the piezoelectric driving device according to the embodiment. The embodiments may be combined as appropriate.

What is claimed is:

1. A control method for a piezoelectric driving device including:
   a vibrating body including a piezoelectric element for driving and configured to vibrate when a driving signal including a periodic signal is applied to the piezoelectric element for driving;
   a section to be driven that is driven by a vibration of the vibrating body; and
   a driving-signal generating section configured to generate the driving signal using a pulse signal generated based on a target pulse duty ratio,
   the driving-signal generating section detecting voltage amplitude generated in the piezoelectric element for driving and generating the target pulse duty ratio based on the voltage amplitude, wherein
   the driving signal includes an intermittent signal formed by an output period in which the periodic signal is output and a suspension period in which an output of the periodic signal is suspended, and
   when the voltage amplitude in the output period is represented as output-period voltage amplitude and the voltage amplitude in the suspension period is represented as suspension-period voltage amplitude, the driving-signal generating section detects the output-period voltage amplitude and does not detect the suspension-period voltage amplitude.

2. The control method for the piezoelectric driving device according to claim 1, wherein
   the piezoelectric element for driving includes a stretching piezoelectric element that causes the vibrating body to stretching-vibrate and a bending piezoelectric element that causes the vibrating body to bending-vibrate, and
   the driving-signal generating section does not detect the suspension-period voltage amplitude generated in the bending piezoelectric element.

3. The control method for the piezoelectric driving device according to claim 1, wherein
   the piezoelectric element for driving includes a stretching piezoelectric element that causes the vibrating body to stretching-vibrate and a bending piezoelectric element that causes the vibrating body to bending-vibrate, and
   the driving-signal generating section does not detect the suspension-period voltage amplitude generated in the stretching piezoelectric element.

4. The control method for the piezoelectric driving device according to claim 1, wherein the driving-signal generating section controls driving speed of the section to be driven according to a ratio of the output period to a total of the output period and the suspension period.

5. The control method for the piezoelectric driving device according to claim 1, wherein the driving-signal generating section sets a time interval for detecting the output-period voltage amplitude shorter than one cycle of the periodic signal.

6. The control method for the piezoelectric driving device according to claim 1, wherein the driving-signal generating section sets the suspension-period voltage amplitude to a fixed value, averages, with a time, a value obtained by adding up the output-period voltage amplitude and the fixed value, and generates the target pulse duty ratio based on a result of processing of averaging.

7. The control method for the piezoelectric driving device according to claim 6, wherein the driving-signal generating section sets the fixed value to 0.

8. The control method for the piezoelectric driving device according to claim 6, wherein the driving-signal generating section sets the fixed value to a value other than 0.

9. A piezoelectric driving device comprising:
a vibrating body including a piezoelectric element for driving and configured to vibrate when a driving signal including a periodic signal is applied to the piezoelectric element for driving;
a section to be driven that is driven by a vibration of the vibrating body; and
a driving-signal generating section configured to generate the driving signal using a pulse signal generated based on a target pulse duty ratio, the driving signal including an intermittent signal formed by an output period in which the periodic signal is output and a suspension period in which an output of the periodic signal is suspended, wherein
the driving-signal generating section does not detect suspension period voltage amplitude generated in the piezoelectric element for driving in the suspension period, detects output period voltage amplitude generated in the piezoelectric element for driving in the output period, and generates the target pulse duty ratio based on a detected output period voltage amplitude.

10. A robot comprising:
a first arm;
a second arm coupled to the first arm in a joint section; and
the piezoelectric driving device according to claim 9 disposed in the joint section.

* * * * *